United States Patent [19]

Lutz

[11] Patent Number: 5,679,087

[45] Date of Patent: Oct. 21, 1997

[54] MOTOR VEHICLE PLANETARY TRANSMISSION FOR THE DRIVE TRAIN OF A MOTOR VEHICLE

[75] Inventor: Dieter Lutz, Schweinfurt, Germany

[73] Assignee: Fichtel & Sachs AG, Schweinfurt, Germany

[21] Appl. No.: 491,079

[22] Filed: Jun. 16, 1995

[30] Foreign Application Priority Data

Jun. 18, 1994 [DE] Germany .................. 44 21 427.8

[51] Int. Cl.[6] .................................................. F16H 57/08
[52] U.S. Cl. ........................................... 475/149; 475/346
[58] Field of Search ............................... 475/149, 331, 475/346

[56] References Cited

U.S. PATENT DOCUMENTS

| 3,770,074 | 11/1973 | Sherman ............... 475/149 |
| 4,796,722 | 1/1989 | Kumagai ............... 180/297 |
| 4,918,344 | 4/1990 | Chikamori et al. ............... 475/149 |
| 5,156,579 | 10/1992 | Wakuta et al. ............... 475/149 |

FOREIGN PATENT DOCUMENTS

| 0249807 | 12/1987 | European Pat. Off. . |
| 0525663 | 2/1993 | European Pat. Off. . |
| 0544092 | 6/1993 | European Pat. Off. . |
| 3725620 | 2/1989 | Germany . |
| 4120262 | 5/1992 | Germany . |
| 2089931 | 6/1982 | United Kingdom . |
| 2107425 | 4/1983 | United Kingdom . |
| 2268995 | 1/1994 | United Kingdom . |

OTHER PUBLICATIONS

VDI–Berichte No. 878; "Das elektrische Getriebe von Magnet–Motor für PKW und Omnibusse"; 1991; Dr. P Ehrhard; pp. 611–622.

Primary Examiner—Charles A. Marmor
Assistant Examiner—Sherry Lynn Estremsky
Attorney, Agent, or Firm—Nils H. Ljungman and Associates

[57] ABSTRACT

The present invention relates to a motor vehicle planetary transmission component for the individual drive of a wheel of a motor vehicle. The planetary transmission component comprises a rotary component of a motor which is mounted with its motor shaft by means of a roller bearing on a support part, which support part simultaneously forms a housing for a planetary transmission. The motor shaft supports, equiaxially with respect to its axis of rotation, a sun wheel which is surrounded by a ring gear held on the support part. Engaged with the sun wheel and the ring gear are planet wheels which are supported axially parallel to the axis of rotation of the motor shaft on a driven shaft part of the planetary transmission. The driven shaft part is supported by means of a single, single-row roller bearing on the support part. This roller bearing is located on the side of the plane of rotation of the planet wheels axially farther from the roller bearing of the motor shaft, and has some radial play. The toothed portions of the planet wheels can thus move relative to the toothed portions of the ring gear or the toothed portions of the sun wheel, and also support the driven shaft part.

8 Claims, 8 Drawing Sheets

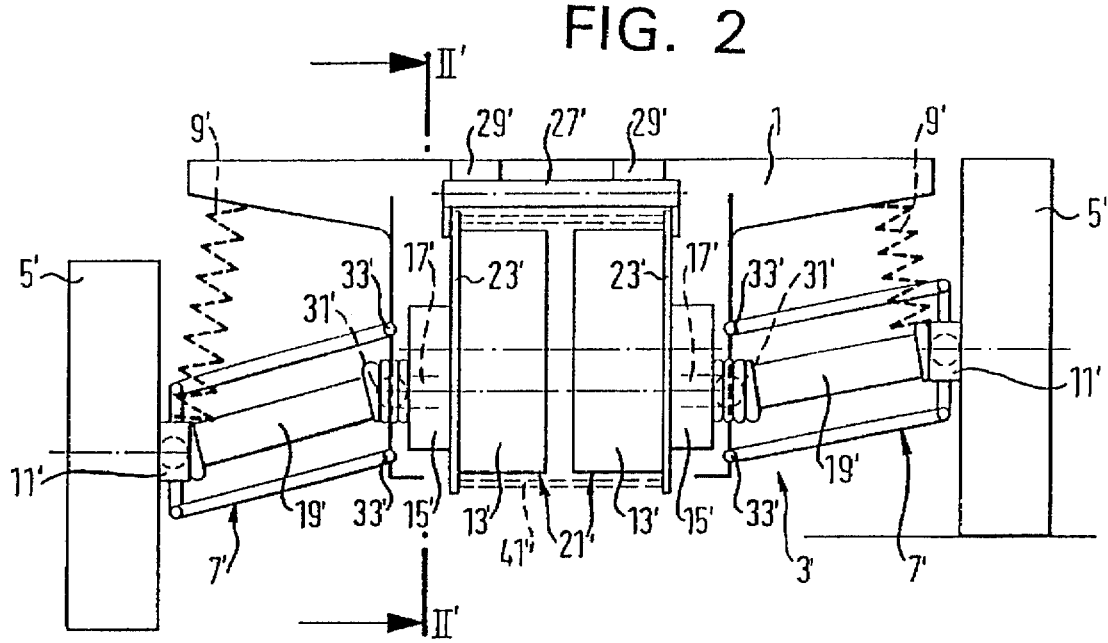
FIG. 2
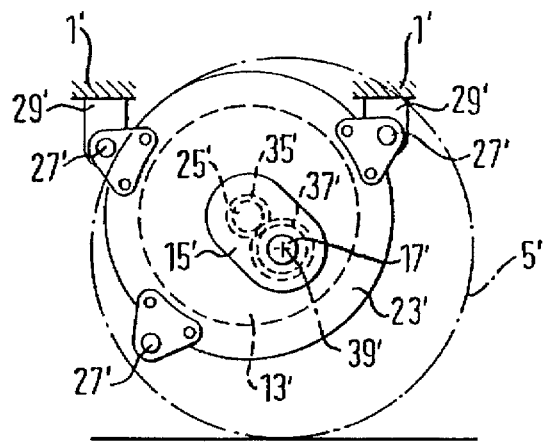
FIG. 2a
FIG. 3

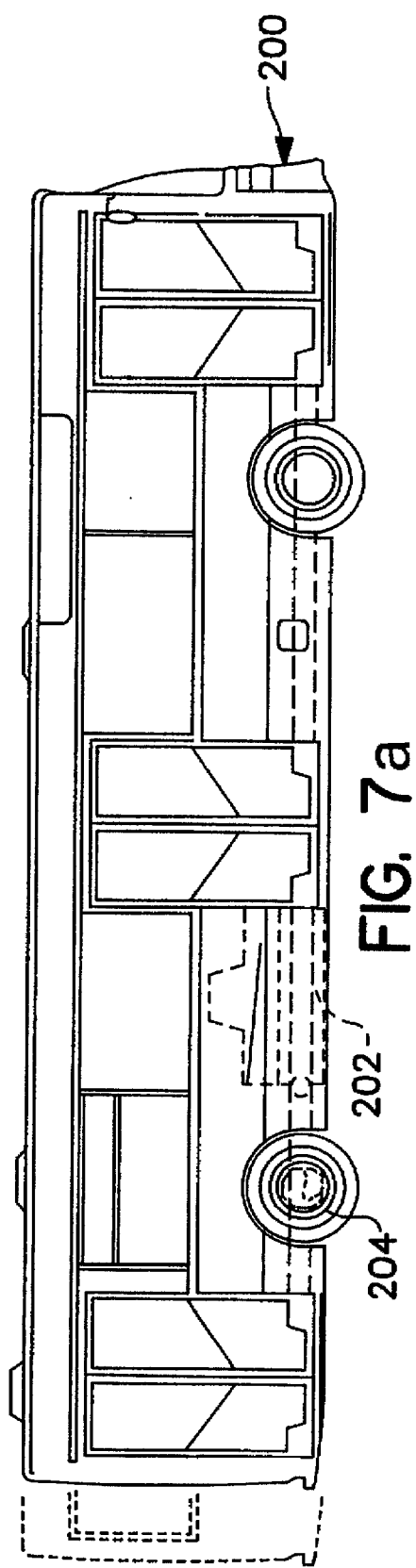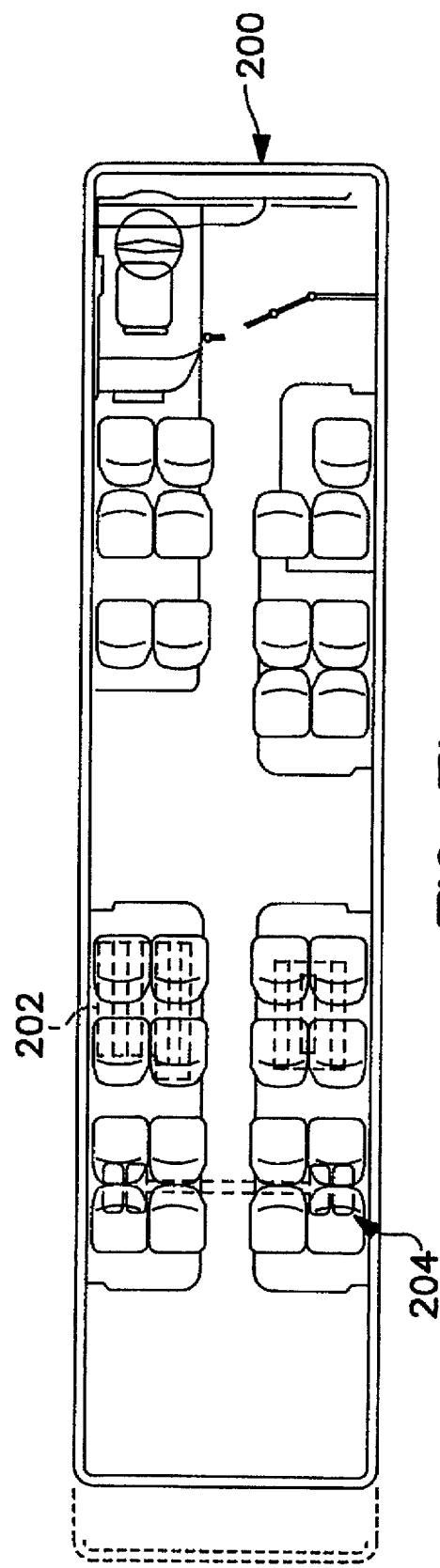

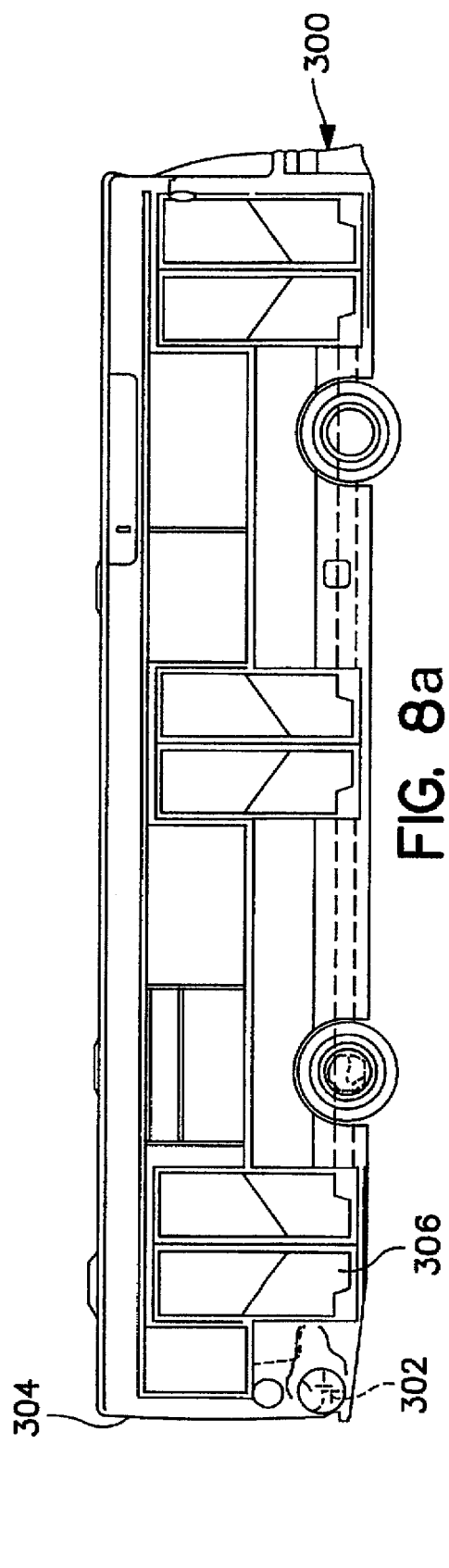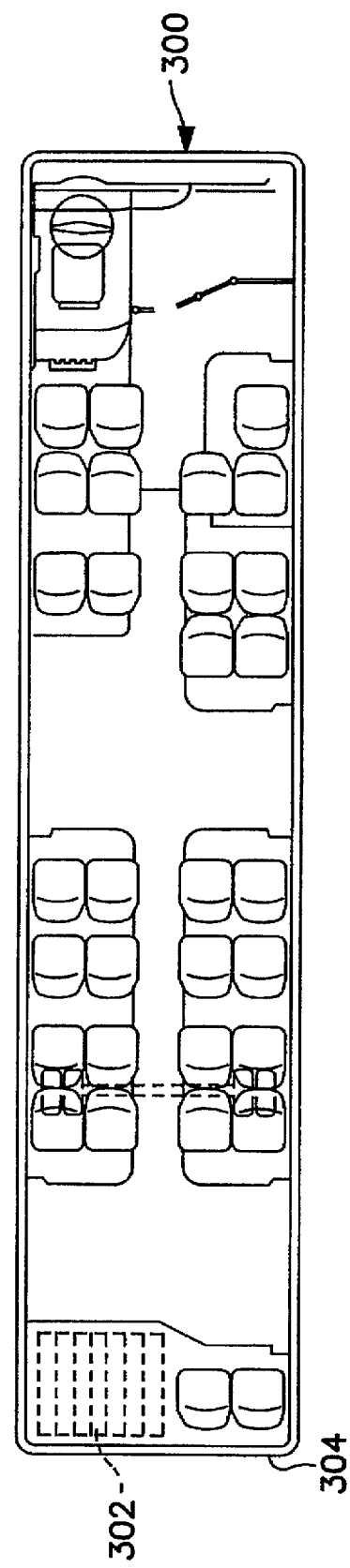
FIG. 8a
FIG. 8b

5,679,087

MOTOR VEHICLE PLANETARY TRANSMISSION FOR THE DRIVE TRAIN OF A MOTOR VEHICLE

BACKGROUND OF THE INVENTION

1. Field of the Invention

The present invention generally relates to a planetary transmission for the drive train for the individual propulsion of a wheel of a motor vehicle.

2. Background Information

Conventionally, the drive train of a motor vehicle provides the propelling action for the drive wheels of the motor vehicle. The vehicle has front and rear wheelsets, each comprising a right and left side wheel. The conventional drive train comprises a drive apparatus for delivering torque to at least a front wheel and a rear wheel on one side of the vehicle. The drive train comprises all the parts that generate power and transmit the power to the driving wheels. Such parts include the engine, the transmission, the driveline, the differential assembly, and the driving axles. The engine and transmission are mounted on the frame and the driving wheels are free to move up and down in the angularity of the line of drive. Therefore, flexibility is needed in the drive train, and such flexibility usually is provided by universal joints. The universal joint transmits torque and/or rotational motion from one shaft to another at fixed or varying angles. Universal joints at both ends of the drive shaft can compensate for changes in angularity of the driveline.

In some conventional drive trains, the driving axle must transfer driving power to the wheels and, at the same time, compensate for the steering action on turns. To solve this fluctuation problem, special universal joints known as constant velocity joints may be used.

In addition to line of drive problems which can be caused by angularity of the drive shaft, the distance between the transmission output shaft and the drive pinion shaft is typically subject to change. This creates the need for some flexibility in the length of the drive shaft.

Conventionally, the drive wheels of a motor vehicle which are guided flexibly by means of their wheel guides on the vehicle body can have separate motors, which separate motors are rotationally connected to the corresponding drive wheels by means of universal-joint propeller shafts. The motors can be powered, at least indirectly, by an internal combustion engine.

The motors of such known drive assemblies are typically combined into one component, which component is elastically damped but is mounted on the vehicle body, essentially stationary relative to it. In addition, the three-dimensional position of the instantaneous axis of rotation of each drive wheel can change during its suspension movement. As a rule, the motor with the universal joint propeller shaft connecting the drive wheel should not only be able to execute a bending movement, but it must also allow for the differences in length, which differences typically result during the bending movement of the universal joint propeller shaft. In conventional motor drive trains, an attempt is therefore made to place the motor-side joint of the universal joint propeller shaft as far as possible toward the center of the vehicle, since the bending angle and the longitudinal offset of the universal joint propeller shaft are smaller, the longer the universal joint propeller shaft can be made.

In additional conventional drive trains, each of the two motors can be connected into one component, in which the transmission projects radially beyond the motor in its axis of rotation, and is located on the side of the motor farther from the corresponding drive wheel. In this manner, a niche can be created, radially outboard of the motor and facing the drive wheel, in which niche the motor-side joint of the extended universal joint propeller shaft can be installed. The two motor components can be combined by means of their housings into a single unit, which unit is then fastened to the vehicle. But the two components can also be installed individually and can be separated by some distance.

In yet another type of conventional drive train, such a motor vehicle can have motors corresponding to the individual drive wheels, whereby the motors can be combined into one component and located axially between the drive wheels. Each motor can face the drive wheel to be driven.

Furthermore, conventional drive trains comprise drive wheels having corresponding separate motors which are rotationally connected to the corresponding drive wheels by means of universal joint propeller shafts. The motors are combined into one component which drive the corresponding drive wheels directly.

In additional conventional drive trains, the propulsion system has motors which are also combined into pairs into a single component, whereby the driven shaft part of each transmission is connected by means of a universal joint propeller shaft to the corresponding drive wheel, which drive wheel is in turn guided and suspended on the vehicle body. To be able to use the longest possible universal joint propeller shaft, and thus those to which the load is applied at only comparatively small bending angles, the spur gear transmissions are located between the motors, so that the driven shaft parts of the spur gear transmissions can be installed radially alongside the motors and near the longitudinal center plane of the motor vehicle. Both the motor shaft of the motor and the driven shaft parts of the spur gear transmissions can be mounted by means of double-row roller bearings on bearing sleeves of the transmission housing.

The conventional drive train of a motor vehicle also has motors corresponding to the individual drive wheels; whereby the motors can be combined into one component and can be located axially between the drive wheels and facing the drive wheel to be driven. A planetary transmission can be attached to the motor, the sun wheel of which sits on the driven shaft of the motor, and the planet carrier of which supports the planet wheels and is connected to the drive wheel by means of a universal joint propeller shaft. A ring gear which, like the sun wheel, is engaged with the planet wheels, can be fixed by means of a multiple disc brake relative to the motor, and when the brake is released, can make it possible to uncouple the motor from the drive wheel. The motors, axially on both sides of their rotor bodies, have rotors which are mounted in a motor housing. While the planet carrier which forms the driven shaft part is supported by means of a bearing neck in the motor shaft, which motor shaft in this area is designed as a hollow shaft and supports the sun wheel, the ring gear which can be fixed by means of the multiple disc brake is, for its part, rotationally mounted on a bearing extension of the motor housing.

OBJECT OF THE INVENTION

The object of the present invention is to create a motor-transmission component which has relatively small dimensions, and can still be designed for a high output power.

SUMMARY OF THE INVENTION

The present invention, as shown in FIG. 1a, departs from the ball bearing 43, which ball bearing 43 can have an inner ring 47 which can sit on the driven shaft part 41, an outer ring 49 which can coaxially surround the inner ring 47, and a number of balls 51 located in a row. The balls 51 preferably run in raceways 53, 55 of the inner ring 47 and of the outer ring 49, respectively, which raceways 53, 55 can be radially opposite one another. To achieve radial play between the inner ring 47 and the outer ring 49, the radius of the raceways 53, 55 can preferably be slightly larger, e.g. by about 2 to 3%, than the radius of the balls 51.

The chamber 35 can form a housing for the planetary transmission 7 which is closed externally by the driven shaft part 41, which can preferably be designed as a solid disc. While the kinetic seal 23 can seal the housing with respect to the motor side, a kinetic seal 45 located between the driven shaft part 41 and the support part 5, on the side of the ball bearing 43 axially farther from the plane of rotation of the planet wheels 37, can provide an external seal for the transmission housing.

In the embodiment described above, the driven shaft part 41 can preferably be used as a planet carrier for the planetary transmission 7. It should also be apparent that, if necessary, the ring gear 33 can also be located on the driven shaft part 41, in which case the planet wheels 37 can be supported by means of their journal necks on the support part 5. In both variants, the driven shaft part 41 can be used directly for fastening the transmission-side joint of a universal joint propeller shaft connected to the wheel. Suitably threaded holes are shown at 57. Instead of the external rotor motor 3 described in the embodiment, motors of another design can also be used, in particular internal rotor motors, or motors with rotors mounted axially n both sides.

The present invention is based on a motor-transmission component of the type described above, which comprises:
a support part,
a motor with a motor shaft which can rotate around an axis of rotation relative to the support part, a rotor held on the motor shaft and a stator which is stationary relative to the support part, and
a planetary transmission with a driven shaft part which can rotate around the axis of rotation relative to the support part and three transmission components which can rotate relative to one another around the axis of rotation, a first transmission component of which can preferably form a sun wheel which is centered on the axis of rotation, a second transmission component of which can preferably form a ring gear which coaxially surrounds the sun wheel, and a third transmission component of which can preferably form a planet carrier, and several planet wheels which can be rotationally mounted axially parallel to the axis of rotation, are offset from one another in the circumferential direction, and can be engaged with the sun wheel and the ring gear, whereby the first transmission component can be non-rotationally and equiaxially connected to the motor shaft, another of the three transmission components can be fastened to the driven shaft part, and yet another of the three transmission components can be non-rotationally connected to the support part.

The present invention teaches that in such a component, the motor shaft and the driven shaft part can be mounted by means of roller bearings on the support part on axially opposite sides of the plane of rotation of the planet wheels, and that the driven shaft part and the transmission component permanently connected to it can be jointly mounted on the support part by means of a single, single-row roller bearing which is capable of some radial play.

Conventional roller bearings used to mount driven shaft parts of such components, e.g. like those described in EP-A-249 807, are designed as double-row roller bearings, to rigidly support the driven shaft part at the bearing point with the greatest possible width of support. In contrast to the conventional arrangement, the present invention teaches that the planet wheels can also be used to provide bearing support for the driven shaft part, to essentially guarantee that the driven shaft part and the transmission components connected to it can be essentially automatically adjusted relative to the other transmission components. The play of the single-row roller bearing can thereby be large enough that the toothed portions of the transmission components which are provided on the driven shaft part, on the one hand, and on the support part, on the other hand, can be adjusted in relation to one another, i.e. they can be used in addition to the single-row roller bearing to provide support for the driven shaft part. Since only one single-row roller bearing is used, the axial dimensions of the component can be reduced.

The single-row roller bearing is preferably a ball bearing, in particular a ball bearing in which at least one of the raceways in an inner ring and an outer ring of the ball bearing to guide the balls has a raceway radius which is about 1 to 4%, in particular about 2 to 3%, larger than the radius of the balls.

The electric motor can preferably be designed as an external rotor motor with a ring-shaped stator which encloses a cavity, and a ring-shaped external rotor, in particular a permanent magnet external rotor, which surrounds the stator radially outwardly and is held on one end of the motor shaft. Such known motors are very powerful and take up only a small amount of space in the axial direction. The component comprising the transmission can also be designed so that it is particularly flat in the axial direction, if the support part has a bearing extension which extends axially into the cavity of the stator, enclosing the motor shaft, and also if the motor shaft, by means of the roller bearing corresponding to it, is supported in the bearing extension axially between the one end of the motor shaft supporting the rotor and the sun wheel located on the motor shaft. This bearing can also be a single-row ball bearing, in particular if the sun wheel is located axially very near this roller bearing. It has also been found to be appropriate if the motor shaft, at least in a portion of its length between the sun wheel and the roller bearing supporting the motor shaft on the bearing extension, has a tubular shape, e.g. if it is designed as a laminated tubular part and can thereby, to some extent, radially elastically absorb the secondary bending forces of the sun wheel.

The support part can also be used to form a transmission housing, and can contain lubricant, if necessary. To provide a seal for such a housing, the driven shaft part can be designed as an axially sealed component, and, on the side of the single-row roller bearing axially farther from the planet wheels, can be sealed by means of a first kinetic seal or motor seal with respect to the support part, while the motor shaft can be sealed by means of a second kinetic seal with respect to the bearing extension. In this manner, the driven shaft part can preferably simultaneously be used as a cover for the housing.

The driven shaft part can preferably form the planet carrier, whereby the ring gear can be correspondingly held on the support part. It should be apparent that, as a function of the desired reduction ratio to be achieved by the planetary transmission, the ring gear can also be provided on the driven shaft part, while the planet carriers can be rotationally mounted on the bearing part.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a motor vehicle planetary transmission for the drive train of a motor vehicle, the drive train having a motor for generating mechanical power, a housing disposed about at least a portion of the motor, at least one wheel for receiving mechanical power from the motor to drive the motor vehicle, a propeller shaft connected to the at least one wheel for transferring mechanical power to that at least one wheel, the planetary transmission for connecting the motor to the propeller shaft of the drive train for rotating the propeller shaft, the planetary transmission comprising: a sun gear; a ring gear; a planet gear carrier; the sun gear being disposed centrally with respect to the ring gear; the ring gear being disposed substantially concentrically about the sun gear; a plurality of planet gears; the planet gear carrier rotatably mounting the plurality of planet gears between the sun gear and the ring gear; the plurality of planet gears disposed between and in contact with the sun gear and the ring gear; the plurality planet gear being disposed between and intermeshed with the sun gear and the ring gear; the planet gears having a plane of rotation; the planetary transmission further comprising: a first apparatus for connecting; a first device for transmitting rotational power; the first connecting apparatus connecting the sun gear to the first transmitting device; the first apparatus for connecting comprising an apparatus for non-rotationally connecting; the first transmitting device providing rotation of the sun gear; the planetary transmission further comprising: a second device for transmitting rotational power; one of the first transmitting device and the second transmitting device being operatively connected to the motor to receive power from the motor; the other of the first transmitting device and the second transmitting device being operatively connected to the at least one wheel to transmit power to the at least one wheel; the planetary transmission further comprising: a second apparatus for connecting; the second connecting apparatus connecting one of: the ring gear and the planet gear carrier to the second transmitting device; the second apparatus for connecting comprising means for non-rotationally connecting; the planetary transmission further comprising: a support structure; the support structure being connected to the housing; the other, of the ring gear and the planet gear carrier connected to the second transmitting device, being connected to the support structure; an apparatus for rotatably supporting one of: the first transmitting device and the second transmitting device with respect to the support structure; the apparatus for rotatably supporting being disposed axially with respect to the plane of rotation of the planet gears; the planetary transmission further comprising: a bearing comprising an inner ring, an outer ring, and a plurality of rotating elements; the outer ring being disposed to coaxially surround the inner ring; the inner ring comprising an inner race; the outer ring comprising an outer race; the plurality of rotating elements comprising a single row of rotating elements being disposed between the inner race and said outer race; the single row of rotating elements being disposed to be rotated by at least one of the inner race and the outer race; the inner ring being disposed substantially on the second transmitting device; the bearing supporting the second transmitting device with respect to the support structure; the second transmitting device being connected to and rotating with one of the ring gear and the planet gear carrier; and the support structure supporting the other of the ring gear and the planet gear carrier not connected to the second transmitting device.

BRIEF DESCRIPTION OF THE DRAWINGS the present invention is explained in greater detail below with reference to the accompanying drawings, in which:

FIG. 2 is a schematic view of a drive axle of a motor vehicle, viewed in the direction of travel, with one embodiment of an electrical drive assembly according to the present invention;

FIG. 2a is a schematic side view of the drive assembly, viewed along a line II—II in FIG. 2;

FIG. 3 illustrates a variant of the drive assembly illustrated in FIG. 2;

FIGS. 7a and 7b illustrate elevational and plan views, respectively, of a bus, such as an urban public transportation bus, which may employ one or more hybrid drives in accordance with at least one preferred embodiment of the present invention;

FIGS. 8a and 8b illustrate elevational and plan views, respectively, of another bus, such as an urban public transportation bus, which may employ one or more hybrid drives in accordance with at least one preferred embodiment of the present invention;

DESCRIPTION OF THE PREFERRED EMBODIMENT

Figure 1:
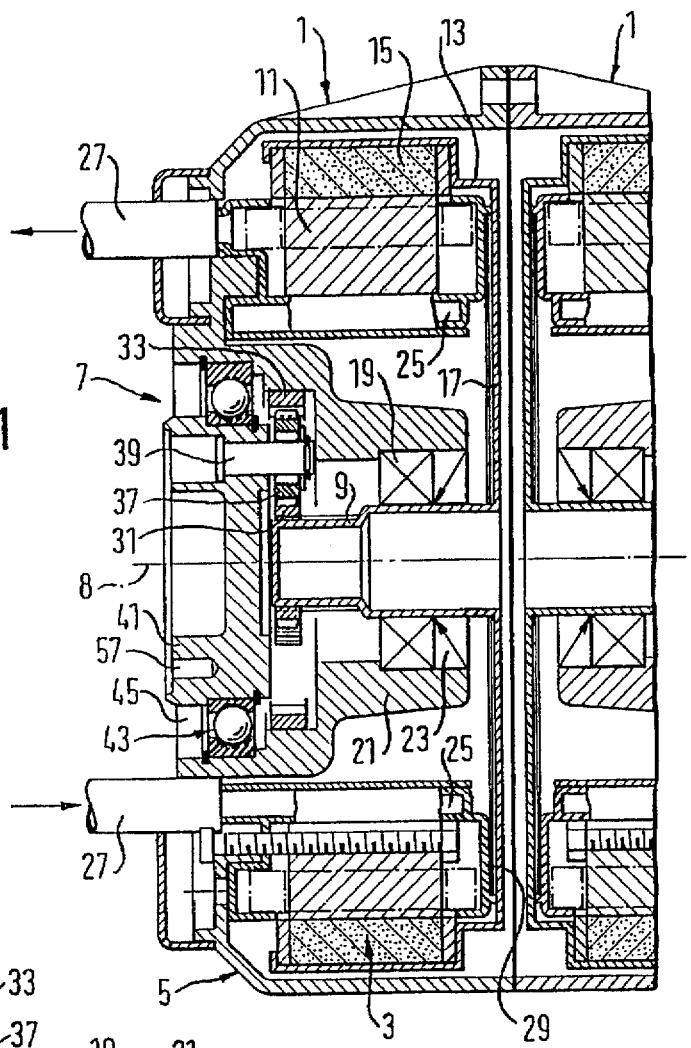
FIG. 1 shows an axial longitudinal section through an electric motor-transmission component in a tandem arrangement for the propulsion of two wheels which jointly correspond to a drive axle of a motor vehicle.

FIG. 1 shows two essentially identical electric motor-transmission components 1 combined into a single component, whereby each of the electric motor-transmission components can be connected by means of a universal joint propeller shaft (see 10' in FIG. 2) to one of two wheels which are jointly part of a drive axle of a motor vehicle. For its part, the component is held between the two drive wheels on a bolster or on the body of the vehicle. The component is held in a manner illustrated in additional detail below with reference to FIG. 2.

Each of the two components 1 can comprise an external rotor electric motor 3, which can be combined by means of a support part, designated 5 in general, with a planetary transmission 7 to form an independent mechanical component. Since the two components 1 are essentially identical, only one of the components 1 is explained in detail below.

Figure 9:
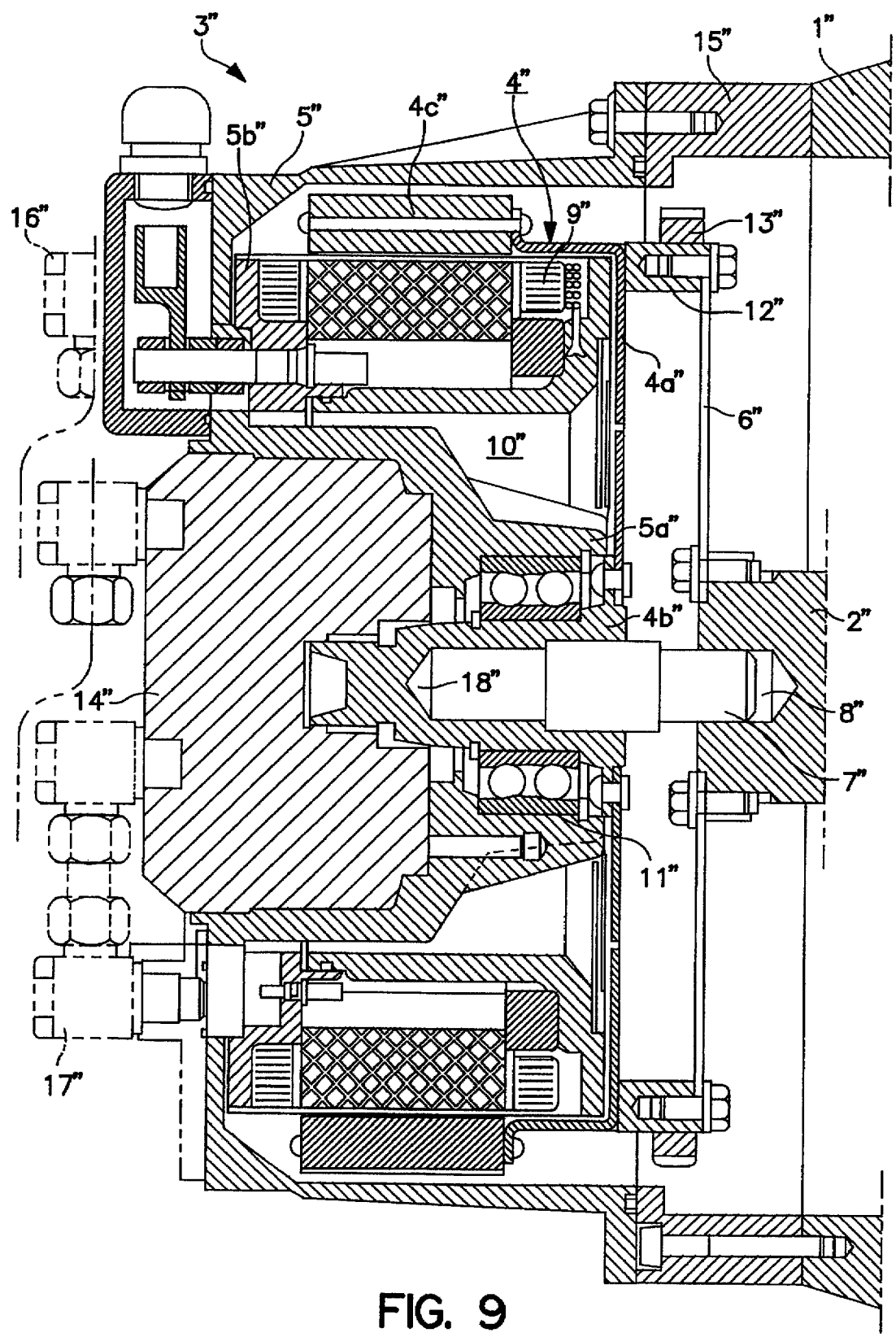
FIG. 9 illustrates an axial longitudinal section of a modular unit including an internal combustion engine and a generator.

The external rotor motor 3 can have a ring-shaped laminated stator 11, which stator 11 can enclose the axis of rotation 8 of its motor shaft 9, and on its outer circumference can form a number of poles, not shown in any detail but see 9" in FIG. 9. The stator 11 can support corresponding field windings. An essentially pot-shaped rotor 13 can be firmly connected to one end of the motor shaft 9, and can preferably surround the stator 11 radially outwardly in a ring-shaped manner. Further, the rotor 13 can have a number of permanent magnets 15, which permanent magnets are radially opposite the poles of the stator 11, whereby the polarity of the permanent magnets 15 can preferably alternate in the circumferential direction. The field windings of the stator 11 can be excited by an electronic commutation device (not shown in any detail), which electronic commutation device can switch the DC current to AC current, whereby the power, the direction of rotation, and the torque of the external rotor motor 3 can be controlled by controlling the commutator device.

In accordance with a preferred embodiment of the present invention, the permanent magnets 15 can create a magnetic field which can flow from the north pole to the south pole. As a result, the field windings of the stator 11 can thereby be surrounded by magnetic fields which essentially make possible clockwise and counterclockwise directions of thrust on the stator 11. The combination of such thrusts can thereby make possible the rotation of the motor shaft 9.

In the illustrated embodiment, the permanent magnets 15 can be inserted in a laminated or sheet metal body designated 17 in general, and on which laminated body 17 the motor shaft 9 can preferably be integrally molded as a laminated tubular part. The motor shaft 9 can be rotationally mounted in a bearing extension 21 by means of a ball bearing 19, e.g. a single-row ball bearing, which bearing extension 21 can extend from the side of the planetary transmission 7, in this case axially into the cavity of the external rotor motor 3 formed by the ring-shaped stator 11. A kinetic seal 23 can seal the motor shaft 9 in relation to the bearing extension 21 on the side of the ball bearing 19 axially farther from the planetary transmission 7.

In accordance with an embodiment of the present invention, a kinetic seal, such as seal 23, can preferably be used to seal a rotating body, such as motor shaft 9.

In the cavity formed by the stator 11, since the external rotor motor 3 can be designed for high drive powers, there is a ring-shaped channel 25 which can preferably be connected to a coolant circuit to cool the stator 11 by means of connections 27. At 29, there can preferably be elements of a phase angle sensor which can detect the phase angle between the rotor 13 and stator 11, and which elements can be connected to the commutator circuit.

Figure 1A:
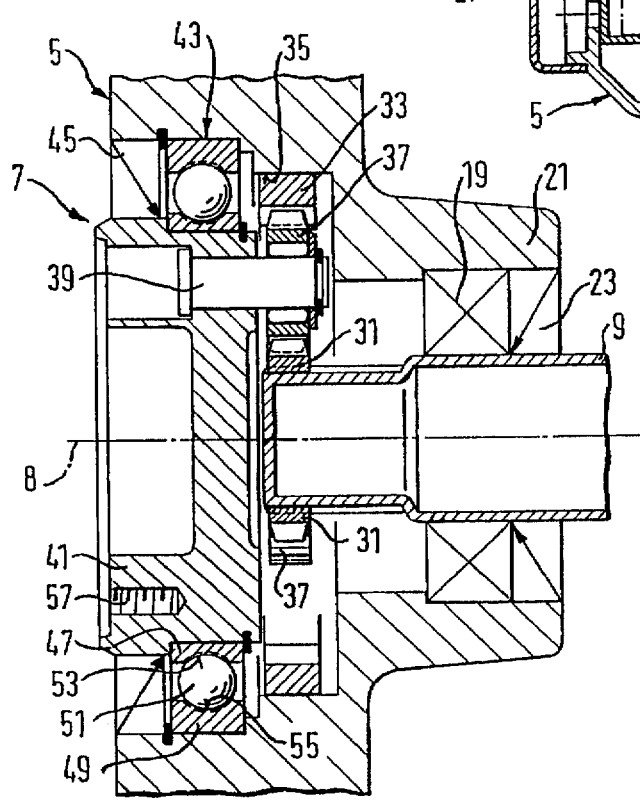
FIG. 1a is a detail of the transmission of the component, in the form of a planetary transmission.

The planetary transmission 7, details of which are visible in FIG. 1a in particular, can generally include a sun wheel 31 which can be non-rotationally attached to the free end of the motor shaft 9, and which can be coaxially surrounded by a ring gear 33. The ring gear 33 can be firmly inserted into the support part 5. The ring gear 33 can thereby sit in a chamber 35 of the support part 5 which makes a transition into the bearing extension 21. There can be engaged with the sun wheel 31 and with the ring gear 33, several planet wheels 37, which planet wheels 37 can be distributed in the circumferential direction and can be mounted axially parallel to the axis of rotation 8 on bearing necks 39 of a driven shaft part 41. The driven shaft part 41 can therefore also be used as a planet carrier, of the planetary transmission 7. The driven shaft part 41 is essentially in the shape of a disc, and can be fixed radially and axially on its outside circumference by means of a single, single-row ball bearing 43 in the chamber 35 of the support part 5. The ball bearing 43 can be located n the side of the plane of rotation of the planet wheels 37 axially farther from the ball bearing 19. The ball bearing 43 can preferably have radial play, so that the driven shaft part 41, and thus the planet wheels 37 can be displaced radially by a small amount with respect to the bearing part 5. The toothed portions of the planet wheels 37, can thus also move relative to the toothed portion of the ring gear 33.

The planet wheels 37 can also be used to support the driven shaft part 41. Since the motor shaft 9, in the area between the sun wheel 31 and the bearing 10, is designed as a laminated or sheet metal part, it can have radially elastic properties, so that secondary bending forces between the planet wheels 37 and the sun wheel 31 can preferably be equalized.

Further regarding FIG. 1a, the ball bearing 43 can have an inner ring 47 which sits on the driven shaft part 41, an outer ring 49 which coaxially surrounds the inner ring 47, and a number of balls 51 located in a row. The balls 51 preferably run in raceways 53, 55 of the inner ring 47 and of the outer ring 49, respectively, which raceways 53, 55 can be radially opposite one another. To achieve radial play between the inner ring 47 and the outer ring 49, the radius of the raceways 53, 55 can preferably be slightly larger, e.g. by about 2 to 3%, than the radius of the balls 51.

The chamber 35 can form a housing for the planetary transmission 7 which is closed externally by the driven shaft part 41, which can preferably be designed as a solid disc. While the kinetic seal 23 can seal the housing with respect to the motor side, a kinetic seal 45 located between the driven shaft part 41 and the support part 5, on the side of the ball bearing 43 axially farther from the plane of rotation of the planet wheels 37, can provide an external seal for the transmission housing.

In the embodiment described above, the driven shaft part 41 can preferably be used as a planet carrier for the planetary transmission 7. It should also be apparent that, if necessary, the ring gear 33 can also be located on the driven shaft part 41, in which case the planet wheels 37 can be supported by means of their journal necks on the support part 5. In both variants, the driven shaft part 41 can be used directly for fastening the transmission-side joint of a universal joint propeller shaft connected to the wheel. Suitably threaded holes are shown at 57. Instead of the external rotor motor 3 described in the embodiment, electric motors of another design can also be used, in particular internal rotor motors, or electric motors with rotors mounted axially on both sides.

FIG. 2 shows a bolster 1', and a drive axle which is designated in general by the number 3', of a motor vehicle with two drive wheels 5', viewed in the direction of travel, located on both sides of the vehicle longitudinal center plane. The drive wheels 5' can be guided by wheel guides 7', here shown as parallel control arm structures which can move essentially in the vertical direction of the vehicle on the bolster 1'. The bolster 1' can sit flexibly on wheel mountings 11' in wheel suspension 9'. The left drive wheel 5' illustrated in FIG. 2 is shown in the rebound state, whereas, the right drive wheel 5' is shown in the deflected state. Not shown is the vehicle body which is supported on the bolster 1' by means of vibration dampers, e.g. made of rubber, which are also not shown in any further detail. It is apparent that the wheel suspensions 9' and/or the wheel guides 7' can also be connected by hinges or supported in another manner, e.g. directly on the vehicle body.

Each of the two drive wheels 5' of the drive axle system 3' can be driven by a separate electric motor 13' by means of a transmission 15' having an output shaft part 17', the output shaft part 17' of which can be non-rotationally connected to the corresponding drive wheel 5', regardless of its instantaneous vertical position. The transmission 15' can preferably be located on the respective side of the electric motor 13' axially facing the corresponding drive wheel 5', and can be connected with the corresponding drive wheel 5' to form a component which is designated 21'. The component 21' can comprise a support part 23' which can be common to the transmission 15' and to the electric motor 13', on which support part 23' the driven shaft part 17' and a driven shaft 25' of the electric motor 13' can be rotationally mounted by means of pivot bearings which are not illustrated in any further detail. The two components 21' can thus be located separately from one another axially in the space between the drive wheels 5'. The components 21', for their part, can be connected into a unit by means of an auxiliary frame which, in this case, can be formed of several struts 27'. The struts 27' can be attached by means of flanges to the support parts 23', and can be held by means of elastic rubber mounts 29' ion the bolster 1'. It should be apparent that the auxiliary frame can also be designed in another manner. It is essential only that the auxiliary frame could also be an integral component of the bolster 1'. The auxiliary frame can be designed so that the transmission-side joints 31' of the universal joint propeller shafts 19' are essentially located at the location of, or in the vicinity of the instantaneous center of rotation of the drive wheels 5'. In the example of the parallel control rod guide illustrated in FIG. 2, therefore, the transmission-side joints 31' can essentially be located in the plane of transmission-side control rod joints indicated by 33'. The auxiliary frame connecting the components 21' to one another and to the bolster 1' can therefore make it possible to locate the component 21' so that the vertical movement of the drive wheels 5' essentially doe not cause any longitudinal offset of the transmission-side joints 31', so that comparatively short universal joint propeller shafts 19' can also be used.

As shown in FIG. 2a, the driven shaft part 17' of the transmission 15' can preferably be offset axially parallel to the driven shaft 25' of the electric motor 13'. The electric motor 13' can have an approximately cylindrical shape, whereby the driven shaft part 17' can preferably lie radially inside the circumferential contour of the electric motor 13'. By means of a suitable selection of the relative angular position of the electric motor 13', the position of the driven shaft part 17', in terms of its height and the position in the direction of travel, can be varied by a suitable selection of fastening points of the auxiliary frame on the support part 23', and adapted to the special requirements of the situation. The transmission 15' can, for example, be a reducing spur gear transmission with a pinion 35' which sits on the driven shaft 25' of the electric motor 13', and a gear wheel 37' formed by the driven shaft part 17'.

The bending angle at which the universal joint propeller shaft 19' is bent relative to the axis of rotation of the driven shaft part 17', is limited. To keep the bending angle as small as possible in relation to the extended position of the transmission-side joint 31', the auxiliary frame formed by the struts 27', as shown in FIG. 3, can also be realized so that the axes of rotation of the driven shaft parts 17', as indicated by 39' in FIG. 3, run at an angle to one another. Otherwise, the design is the same as the design explained with reference to the accompanying FIGS. 2 and 2a.

In the embodiments explained above, the support part 23' simultaneously forms the transmission housing of the transmission 15'. But it should be apparent that the transmission housing can also be designed so that it is separate from the support part 23'. The same is true for a housing of the electric motor 13', which can preferably be realized separately from the support part 23'. However, in accordance with a preferred embodiment of the present invention, as indicated by 41', the two electric motors 13' can also be realized without their own housings, to reduce costs and weight. Instead, between the support parts 23', there can be a housing tube 41' which is common to both electric motors 13', which encloses both the electric motors 13'. Although the electric motors can be designed in the conventional manner, they preferably have an external rotor which radially externally encloses the stator which is firmly connected to the support part 23' and has a number of permanent magnets distributed in the circumferential direction with alternating polarity such as that described above with respect to FIGS. 1 and 1a. To prevent the induction of eddy currents and thus a heating of the housing, e.g. of the housing tube 41', the housing or housing tube 41' can preferably made of an insulating material.

Figure 4:
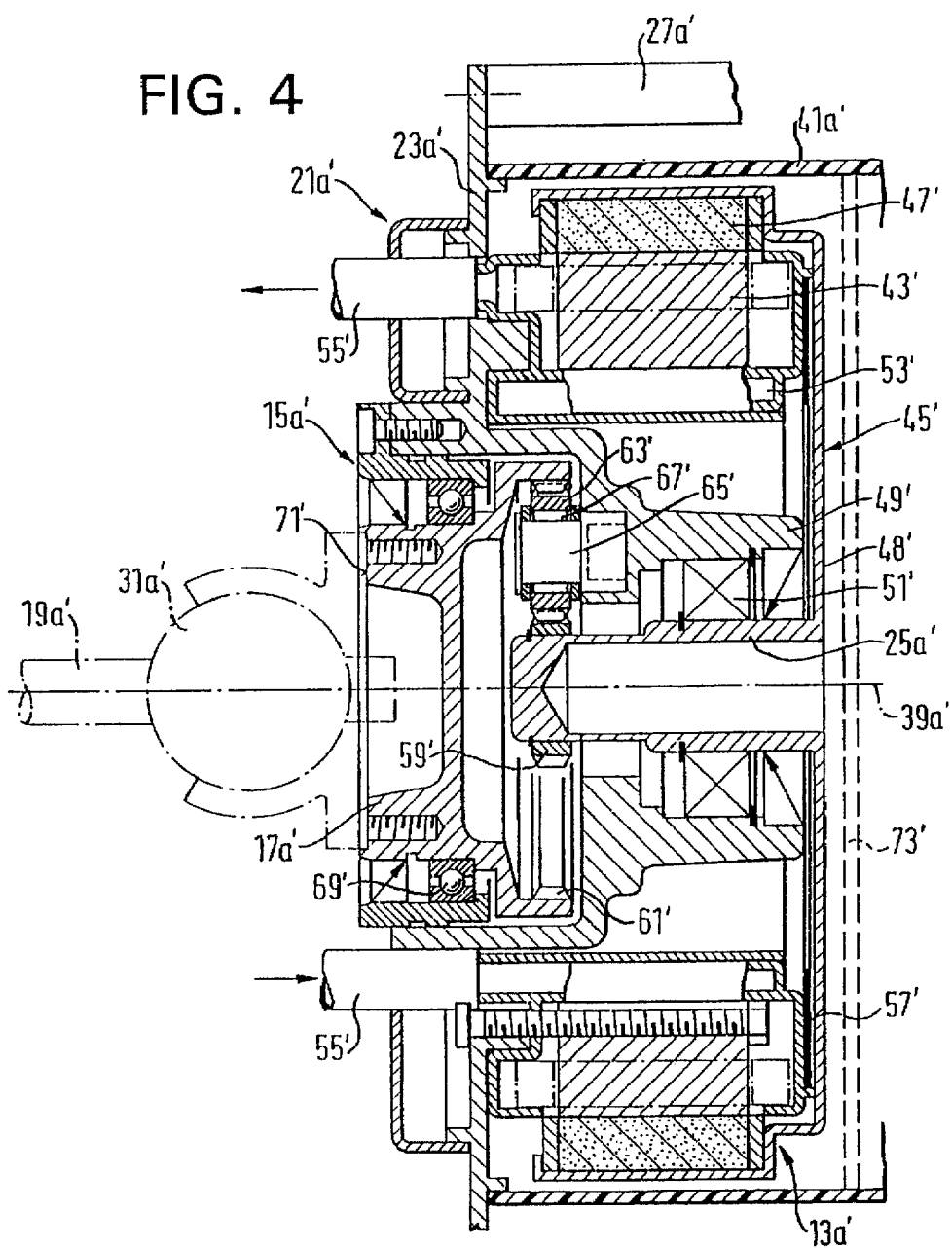
FIG. 4 is an axial longitudinal section through an electric motor-transmission unit for a drive assembly.

FIG. 4 shows one embodiment for a variant of an electric motor-transmission component 21a' which, instead of a spur gear transmission with a driven shaft part located eccentrically in relation to the drive shaft of the electric motor, shows a variant with equiaxial axes of rotation. In the following description, parts which have the same or equivalent functions are indicated with the same reference numbers as in FIGS. 2 to 3, and are provided with a letter to distinguish them. Reference should be made to the description of FIGS. 2 and 3 for an explanation of the general structure and method of operation. FIG. 4 shows only one of the electric motor-transmission components 21a'. The bolster and the other components of the wheel guides etc. corresponding to it are not shown, although they are present.

The electric motor 13a' is designed as an external rotor motor, a sheet metal stator 43' of which preferably forms a very large number of poles distributed in the circumferential direction. Corresponding to the poles there are field windings which are excited during rotation by electronic commutator circuits not shown in any additional detail. The stator 43' is fastened to the support part 23a'. The stator 43' is surrounded radially outwardly by an essentially pot-shaped rotor 45', which on its outside circumference supports a number of permanent magnets which are arranged next to one another with alternating polarity in the circumferential direction. The rotor 45', on the side of the stator 43' axially farther from the support part 23a', has a disc-shaped end wall, from which the driven shaft 25a' extends into a bearing extension 49' of the bearing part 23a' surrounded by the stator 43'. A roller bearing 51' supports the rotor 45' in cantilever fashion on the bearing extension 49'. As shown in FIG. 4, the driven shaft 25a' can be molded in one piece onto the end wall 47', e.g. made of sheet metal, but it can also be attached in another manner.

The electric motor 13a', which is suitable for rather high outputs, can have, radially inside the stator 43', a ring-shaped coolant channel 53', which is connected by means of lines 55' to a coolant circuit. 57' designates elements of an angular position transmitter which is connected to the electronic commutation circuit indicated above.

The support part 23a' simultaneously forms a housing for a planetary transmission 15a' which extends into the inner cavity of the stator 43' and thus saves space. The sun wheel 59' of the planetary transmission 15a' sits non-rotationally on the drive shaft 25a' and is enclosed equiaxially with the axis of rotation 39a' of the driven shaft part 17a' by a ring gear 61' molded or attached to the driven shaft part 17a'. The support part 23a' forms a planet carrier, on which several, e.g. three or five planet wheels 63' are rotationally mounted over bearing necks 65' by means of needle bearings 67'. The planet wheels 63' are engaged with the sun wheel 59' and the ring gear 61', reducing the output speed of the driven shaft part 17a', in relation to the speed of the rotor 45'. The driven shaft part 17a' is mounted by means of its roller bearing 69' on the support part 23a' on the side of the plane of circulation of the planet wheels 63' farther from the rotor 45'. The driven shaft part 17a', in the vicinity of the roller bearing 69', forms a flange surface 71' to which the transmission-side joint 31a' of the universal joint propeller shaft 19a' is fastened, e.g. by means of screws, to the driven shaft part 17a' directly, i.e. without the intermediate piece which significantly changes the distance from the driven shaft part 17a'. In this manner, the joint 31a' can be installed very close to the roller bearing 69'. There is preferably only a single-row roller bearing.

In FIG. 4, the housing tube 41a' made of insulating material, e.g. plastic, is visible, and can hold the permanent magnets 47' of the rotor 45' close together, as a result of which the permanent magnets essentially cannot induce any eddy currents in the housing tube 41a'. The housing tube 41a' can, as explained above, extend beyond both components 21a'. But is can also be extended by means of a rear wall 73' into a plastic housing which corresponds exclusively to one of the electric motors 13a'.

Figure 5:
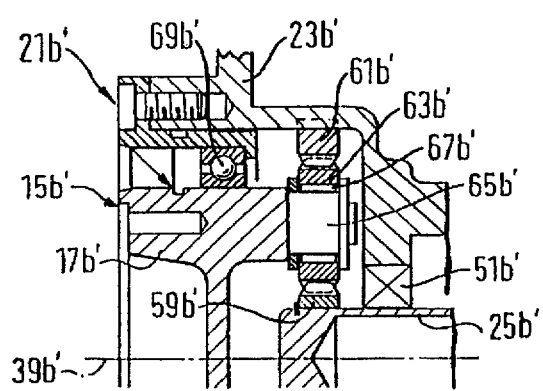
FIG. 5 is a detail of one variant of the component illustrated in FIG. 4.

FIG. 5 shows a variant of a component 21b' which differs from the component illustrated in FIG. 4 essentially only in terms of the design of its planetary transmission 15b'. In this case, the driven shaft part 17b' does not support the ring gear 61b', but forms a planet carrier, on whose bearing necks 65b', which are axially parallel to the axis of rotation 39b', the planet wheels 63b' are rotationally mounted by means of needle bearings 67b'. The planet wheels 63b' are engaged on one hand with the sun wheel 59b' which, in turn, sits on the driven shaft 25b' of the electric motor, and on the other hand with the ring gear 61b', which can be mounted non-rotationally on the support part 23b'. The ring gear 61b' can be molded in one piece to the support part 23b', but it can also be installed at a later time. The electric motor is otherwise the same as the embodiment illustrated in FIG. 4. In particular, the rotor is once again mounted in cantilever fashion by means of the bearing 51b' on the support part 23b'.

The disclosure now turns to a discussion of a hybrid drive arrangement, and vehicles using the same, having components that may be utilized in accordance with the embodiments of the present invention. It should be understood that components discussed herebelow with relation to FIGS. 6–10 may, if appropriate, be considered to be interchangeable with similar components discussed hereabove in relation to FIGS. 1–5.

Figure 6:
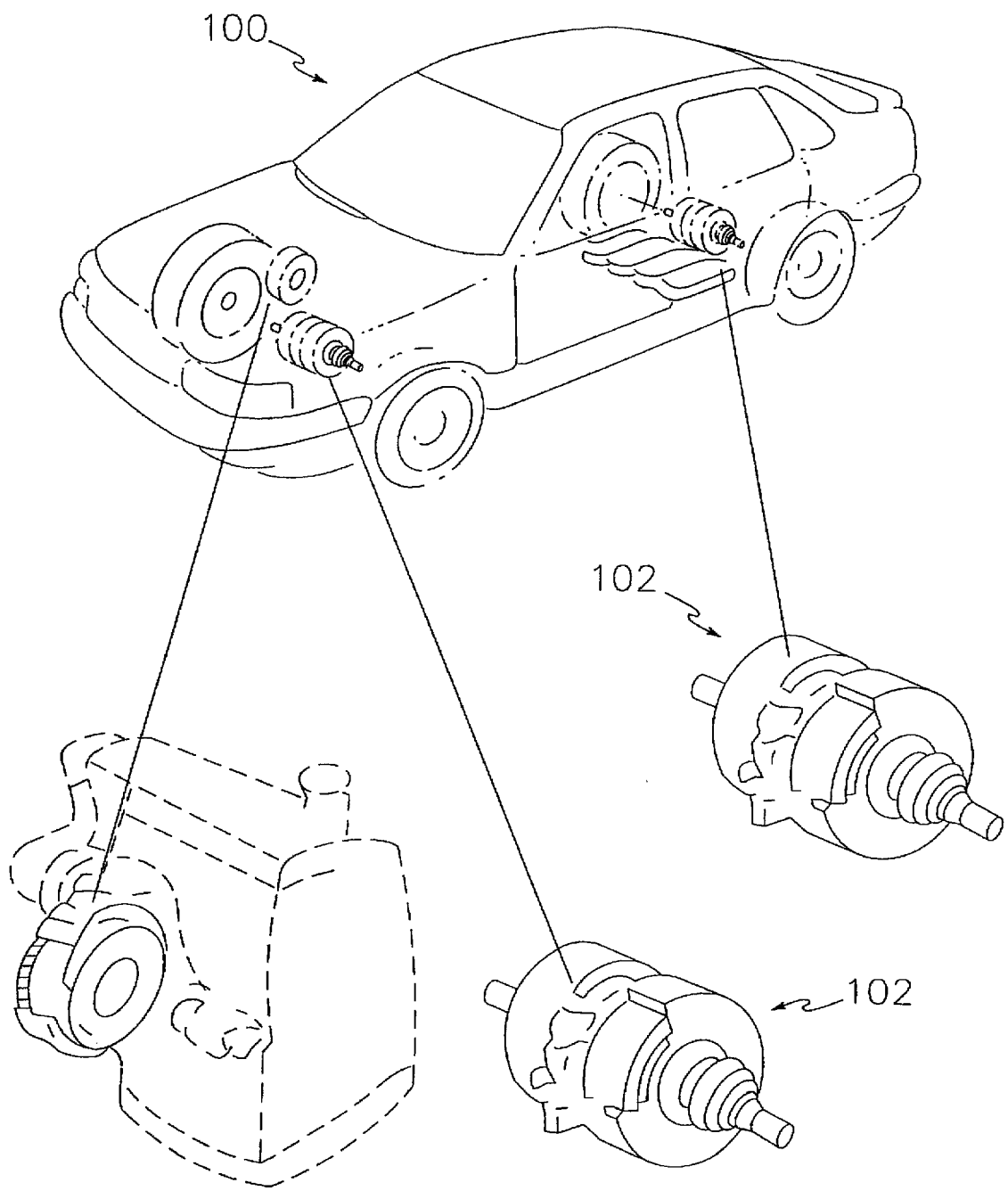
FIG. 6 illustrates a typical automobile which may employ a hybrid drive, such as an internal combustion engine-electric generator unit, in accordance with at least one preferred embodiment of the present invention.

FIG. 6 illustrates a typical automobile in which the present invention may be employed. As shown, an automobile 100 may include two electric motor arrangements, 102, wherein each such motor arrangement can conceivably include two motors for driving a corresponding wheel. It will be appreciated from the disclosure herebelow that such motor arrangements can be driven by a combination, or hybrid, internal combustion engine-electric generator.

The present invention may be employed, for example, in the assembly of buses. Buses, for example, must frequently be designed to accommodate specific road widths, some road widths being extremely narrow relative to other road widths. The present invention, employed in a street bus or an airport bus, for instance, can make possible the specific track distance and dimensions required for assembly of buses for either narrow or wide roads.

FIGS. 7a and 7b illustrate, respectively, a conventional urban transportation bus 200 in elevational and plan view, in which the present invention may be employed. Particularly, the bus 200 may include an internal combustion engine-electric generator unit 202 for powering individual motors associated with corresponding wheels or sets of wheels. In the bus 200 shown in FIGS. 7a and 7b, the internal combustion engine-electric generator unit 202 is shown as being positioned immediately forward of a rearmost set of wheels 204.

FIGS. 8a and 8b illustrate, respectively, another conventional urban transportation bus 300 in elevational and plan view, in which the present invention may be employed. Particularly, the bus 300 may include an internal combustion engine-electric generator unit 302 for powering individual motors associated with corresponding wheels or sets of wheels. In the bus 300 shown in FIGS. 8a and 8b, the internal combustion engine-electric generator unit 302 is shown as being positioned virtually directly adjacent the rear panel portion 304 of the bus 300, and behind a rearmost set of doors 306.

Further details of the functioning of an internal combustion engine-electric generator unit, in conjunction with individual drive motors for individual wheels, can be found in German Patent Application No. 41 33 013 A1 and in VDI-Berichte 878 (199), pages 611–622, both of which are incorporated herein by reference. Particularly, these documents discuss arrangements for controlling individual electric motors associated with corresponding wheels. Similar components and arrangements may also be found in the U.S. Patents listed towards the close of the instant specification.

It should be appreciated that the components discussed hereinabove with relation to FIGS. 6–8b may, if appropriate, be considered to be interchangeable with similar components discussed hereinabove with relation to FIGS. 1–5 and hereinbelow with relation to FIGS. 9 and 10.

The right side of FIG. 9 shows an additional example of an internal combustion engine essentially only in the vicinity of the connection of its engine housing 1" and the crankshaft 2". The electric generator 3" preferably has a generator housing 5", a rotor 4" (such as an external rotor motor) and an internal stator with stator windings 9". The internal stator is preferably permanently connected to a portion 5b" of the generator housing 5". The rotor 4" is preferably equipped with a number of alternately polarized permanent magnets 4c" with high magnetic field strength.

Instead of a permanent magnet external rotor, there could theoretically also be a rotor with electromagnetic excitation. In this case, the commutation of the current in the stator windings 9" is preferably not done electromechanically, but by means of an electronic control system (not shown). It is also possible, although possibly not as desirable, to design the generator as a generator with an internal rotor, in which case the housing of the generator would likely essentially have to be modified correspondingly.

The generator housing 5" is preferably permanently bolted to the engine housing 1", not directly, but by means of an intermediate flange 15" bolted to the engine housing 1", with the intermediate flange 15" preferably projecting on the connection side to the left beyond the end of the crankshaft 2". This intermediate flange 15" can be advantageous because it can essentially eliminate the need for a corresponding extension of the generator housing 5" to the right or, alternatively, an extension of the engine housing 1" to the left. Consequently, it can thereby become possible to leave the connection side of the internal combustion engine, which internal combustion engine can also be used for vehicles with a conventional mechanical drive train (with a flanged connection of the transmission housing), unchanged, like the connection side of the generator housing 5' (which generator housing can preferably be essentially structurally identical to the housing of a corresponding electric motor which drives the wheels of the vehicle). In other words, this generator housing 5" can, in accordance with at least one preferred embodiment of the present invention, essentially represent one half of a housing of a symmetrically designed double motor (tandem motor), such as the one described in the above-referenced VDI-Berichte. The use of such an economically-manufactured intermediate flange 15" therefore can make it possible to continue to use conventional parts manufactured in large-scale series for the generator housing 5" and for the engine housing 1", and thus can contribute to a significant cost reduction, in particular in the case of the manufacture of relatively small series. On the other hand, for large-scale series production, it is possible that it may generally be more economical to make the generator housing in one piece.

The generator housing 5" preferably has an indentation 5a" which extends from left to right into the space 10" enclosed by the stator windings 9". The permanent magnets 4c" of the rotor 4" are preferably fastened to a rotor mount, or rotor bracket, or rotor holder, 4a" preferably designed as a relatively thin-walled element in the form of a wheel (e.g. made of sheet metal). In the vicinity of the axis of rotation of the rotor 4", the rotor mount 4a" is preferably permanently connected to a rotor hub 4b", which hub 4b" preferably extends from the plane of the right end surface of the rotor mount 4a" to the left into the space 10" or, in other words, into a corresponding opening of the indentation 5a". The indentation 5a" preferably extends to the vicinity of the surface of the rotor mount 4a".

The rotor hub 4a" is preferably rotationally mounted inside the indentation 5a", preferably near the rotor mount 4a". In the illustrate example, the bearing 11" can preferably be designed as a double-row roller bearing, namely as a ball bearing. By means of corresponding stop collars, or locator flanges, and retaining rings, or lock washers, an axial locating bearing, or axial fixing bearing, can be formed. To guarantee an essentially precisely coaxial orientation with respect to the crankshaft 2", there are preferably centering holes 18" and 8" in the rotor hub 4b" and in the crankshaft 2" respectively, each preferably coaxial to the axis of rotation, with a correspondingly shaped centering bolt 7", which bolt 7" is preferably inserted into each centering hole 18" and 8". Since the centering bolt 7" can essentially remain in the rotor hub 4b", it can essentially permanently orient the axis of rotation of the rotor 4". Therefore, the bearing 11" can also conceivably be designed as a single-row roller bearing. In many cases, the bearing 11" can also be designed as a floating bearing, or lose bearing, or disengaged bearing, or non-locating bearing.

In addition to a separate mounting of the rotor 4" inside the stator housing 5", which separate mounting may essentially not be necessary and is apparently the custom in the known arrangements, the present invention contemplates, in accordance with at least one preferred embodiment, that the rotor 4" not be coupled directly to the crankshaft 2" for the transmission of torque, but be connected by means of a torque transmission plate 6" which can be deformed elastically in the axial direction, such as the one known by the name "Flexplate". In the illustrate embodiment, the flexplate, or flexible plate, 6" can preferably essentially be in the form of a circular plate which is essentially permanently bolted to the end surface (driven end) of the crankshaft 2". On the circumference, flexplate 6" can preferably be bolted to a connecting element 12" permanently connected to the rotor mount 4a". For the case in which the generator 3" cannot be used as the starter for the internal combustion engine, it may be appropriate to provide a toothed rim 13" for the starter (not shown) on the outside of the connecting element 12". Of course, it would also be possible to design the rotor mount 4a" so that the flexplate 6" could be bolted directly to it. But that could conceivably have the disadvantage that the same functional part as the one which is already present could essentially no longer be used as the rotor mount 4a" for an essentially identical electric motor.

In accordance with at least one preferred embodiment of the present invention, flexplate 6" could essentially be embodied by a disc or plate-type member comprising any material suitable for providing the behavior discussed immediately above, that is, effective torque transmission capacity combined with an ability to deform elastically in the axial direction. Some types of such "flexplates" which may be appropriate for use in conjunction with the present invention may be found in the U.S. Patents listed at the close of the instant specification. Additionally, another type of "flexplate" suitable for the purposes described here is known to be manufactured by Mercedes Benz AG, 70322 Stuttgart, Federal Republic of Germany.

In accordance with at least one preferred embodiment of the present invention, the permanent connection of connecting element 12" with rotor mount 4a" may preferably be achieved by any suitable medium, such as welding.

Since there may conceivably occur unavoidable decreases in efficiency during the operation of the generator, which efficiency decreases can possibly be expressed by an undesirable heating of the generator 3", it may be desirable, in accordance with at least one preferred embodiment of the present invention, to provide forced cooling. The reference numbers 17" and 16" therefore designate a forward motion of the coolant and a reverse motion of the coolant, respectively, of a liquid cooling system, the forced circulation of which can preferably be guaranteed by a coolant pump 14". This coolant pump 14" can preferably advantageously use the available inner portion of the indentation 5a" of the generator housing 5" which extends into the space 10", since in this manner there can essentially be a direct drive by means of the crankshaft 2". The coolant circulation can therefore always preferably take place when the internal combustion engine, and thus of course also the generator 3", is running. For this purpose, the rotor hub 4a" is preferably non-rotationally connected on its left free end to the drive shaft of the coolant pump 14", which drive shaft is preferably designed as a hollow shaft. For reasons of assembly and installation, a plug-in interlocking connection of the shafts is preferred. Such a plug-in interlocking connection may, in accordance with at least one preferred embodiment of the present invention, be achieved by a form-locking of form-fit connection between the shafts in question.

The assembly and installation of the modular unit can be accomplished as follows. First, the intermediate flange 15" can preferably be bolted to the engine housing 1", and the flexplate 6" can preferably be bolted to the end of the crankshaft 2" by means of a corresponding connection flange. The generator 3", in accordance with at least one preferred embodiment of the present invention, will preferably already be available as a separately pre-assembled modular unit, i.e. the rotor 4" will preferably already be in its final position in the generator housing 5". After the insertion of the centering bolt 7", which can also be an immediate component of the rotor hub 4b" or of the crankshaft 2", into the centering hole 18" or 8", the generator 3" is preferably oriented so that it is essentially precisely coaxial with the crankshaft 2" and is fastened to the intermediate flange 15" by means of bolts. In this manner, more complex measures for centering on the engine housing 1" or on the intermediate flange 15" become unnecessary. The centering bolt 7" can preferably remain in the generator 3" essentially as a lost assembly accessory. To bolt the flexplate 6" to the connecting element 12", the intermediate flange 15" and/or the engine housing 1" preferably has an opening (see FIG. 10), through which the fastening bolts can be accessible from outside. If the rotor hub 4b" were to be designed totally as a hollow shaft, and if the inside diameter were to decrease from right to left, the centering bolt 7" (if its external contour were shaped in complementary fashion) could conceivably be extracted from the centering holes 8", 18" after the installation of the generator, and reused. In that case, however, it may first be necessary to install the coolant pump 14", if one was to be used.

To pre-assemble the generator 3", first the ball bearing 11" is preferably inserted in the corresponding hole of the indentation 5a" of the generator housing 5" and fixed in place axially by means of a retaining ring. Then the rotor 4", including the rotor hub 4b", rotor mount 4a" and permanent magnets 4c", is preferably pushed into the bearing 11" from the right side, and is then preferably axially secured from the left side by means of a retaining ring which sits on the rotor hub 4b", also preferably toward the left side. Then the coolant pump 14" can preferably be installed.

Figure 10:
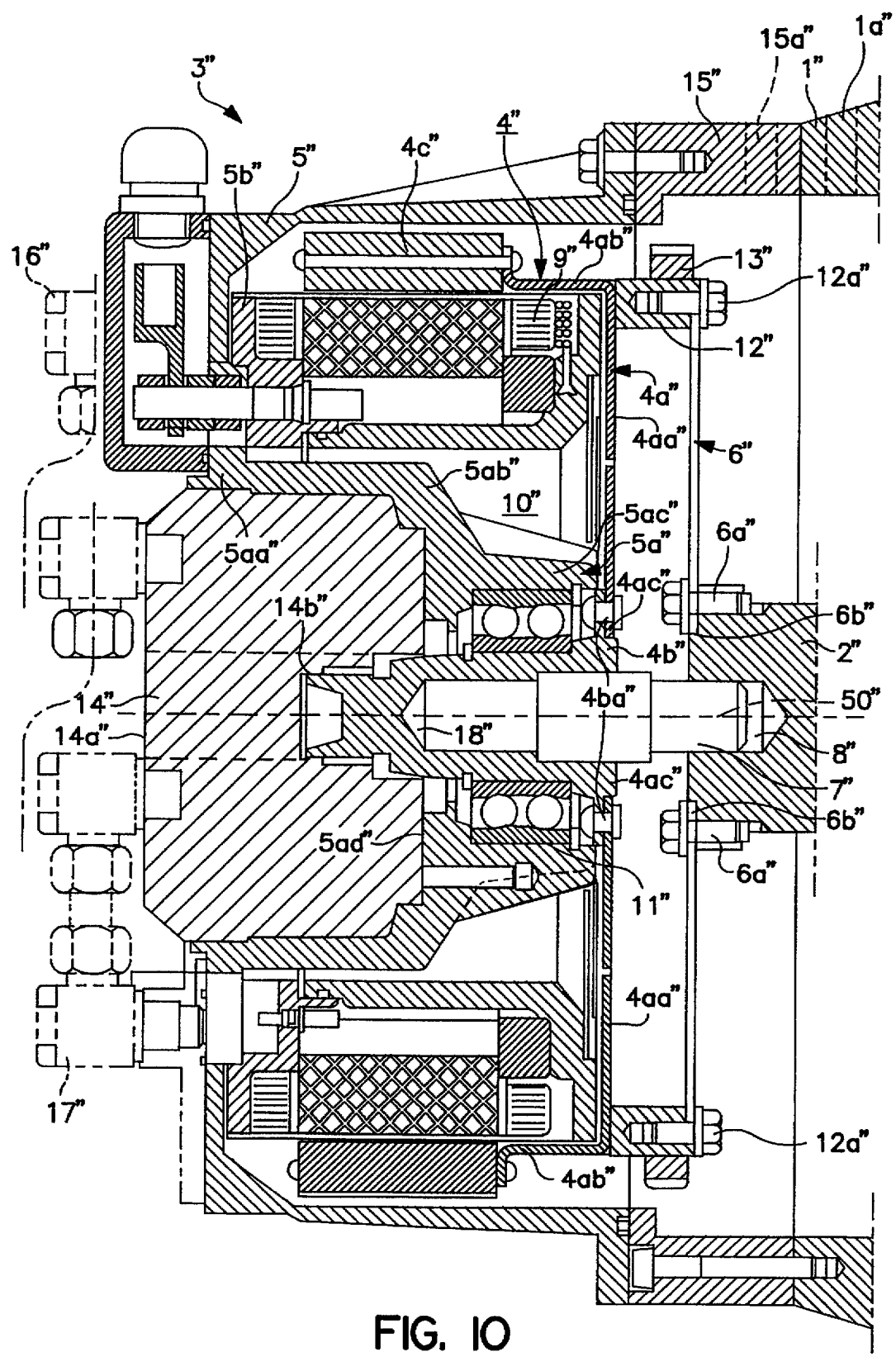
FIG. 10 is essentially the same view as FIG. 9, but more detailed.

FIG. 10 is essentially the same view as FIG. 9, but illustrates additional components.

In accordance with at least one preferred embodiment of the present invention, crankshaft 2", rotor 4", rotor hub 4b" and coolant pump 14" will preferably have a common axis of rotation. This axis, hereinafter termed the "central axis", is indicated in FIG. 10 at 50".

As mentioned heretofore, either or both of internal combustion engine housing 1" and intermediate flange 15" may be provided with appropriately positioned and sized holes 1a" and 15a", respectively, in order to allow tool access to bolts 12a" connecting flexplate 6" with connecting element 12".

Further, in accordance with at least one preferred embodiment of the present invention, indentation 5a" may preferably be embodied by an extension of housing 5" towards internal combustion engine housing 1" and crankshaft 2" in both an axial direction and a radial direction. As such, indentation 5a" may preferably be embodied by: a first portion 5aa", which may be virtually parallel to the central axis 50" or be dispose at a significantly shallow angle, such as between about 1° and about 7°, with respect thereto; a second portion 5ab", extending from a terminal area of first portion 5aa" radially inwardly, and axially towards internal combustion engine housing 1", at a virtual right angle with respect to the central axis 50" or at a significant acute angle, such as between about 7° and about 85°; and a third portion 5ac", being oriented to accommodate bearing 11" and rotor hub 4b" radially inwardly therewithin and extending at an angle virtually parallel to the central axis 50". In accordance with at least one preferred embodiment of the present invention, on a side of the indentation 5a" facing coolant pump 14", or the space for coolant pump 14", there may preferably be a surface 5ad" that is generally perpendicular to the central axis 50".

In accordance with at least one preferred embodiment of the present invention, flexplate 6" will preferably be dimensioned such that it is essentially in the form of a disc, whereby the thickness of the disc constituting flexplate 6" is preferably substantially smaller than the diameter of the flexplate 6", the thickness being measured parallel to the central axis 50" and the diameter being measured with respect to the central axis 50". As a non-restrictive example, in accordance with at least one preferred embodiment of the present invention, flexplate 6" may preferably have a diameter-to-thickness ratio of between about 95:1 and 160:1. Preferably, flexplate 6" may also have a central aperture suitably dimensioned for connecting the flexplate 6" with the crankshaft 2" via bolts or other suitable connecting media 6a". The central aperture can preferably be defined radially within an inner periphery 6b" of the flexplate 6". In accordance with at least one preferred embodiment of the present invention, the ratio of the outer diameter of flexplate 6" to the diameter of inner periphery 6b" may preferably be between about 4:1 and about 6:1.

In accordance with at least one preferred embodiment of the present invention, rotor mount 4a" may preferably include a first portion 4aa" in the form of a wheel or disc, and a second portion 4ab" extending therefrom essentially in the form of a flange. Accordingly, first portion 4aa" may essentially be a circular disc-shaped element centered about the central axis 50" and disposed perpendicular with respect thereto, and second portion 4ab" may preferably essentially be an annular element integral with first portion 4aa" and extending from first portion 4aa" in a direction away from internal combustion engine housing 1" and parallel to the central axis 50". The thickness of the disc constituting first portion 4aa" of rotor 4a" is preferably substantially smaller than the diameter of the first portion 4aa" of rotor 4a", the thickness being measured parallel to the central axis 50" and the diameter being measured with respect to the central axis 50". As a non-restrictive example, in accordance with at least one preferred embodiment of the present invention, first portion 4aa" of rotor 4a" may preferably have a diameter-to-thickness ratio of between about 95:1 and 160:1. Preferably, first portion 4aa" of rotor 4a" may also have a central aperture suitably dimensioned for connecting the first portion 4aa" of rotor 4a" with the rotor hub 4b" via rivets, bolts or other suitable connecting media 4ba". The central aperture can preferably be defined radially within an inner periphery 4ac" of the first portion 4aa" of rotor 4a". In accordance with at least one preferred embodiment of the present invention, the ratio of the outer diameter of first portion 4aa" of rotor 4a" to the diameter of inner periphery 4ac" may preferably be between about 4:1 and about 6:1.

FIG. 10 schematically illustrates the general relative positioning of shaft 14a" of coolant pump 14". Also shown schematically is the aforementioned interlocking, or formlocking, connection 14b" between rotor hub 4b" and shaft 14a".

Using the arrangements contemplated by the embodiments of the present invention, it can essentially be surprising that, not only can the desired simplification and increase in the quality of the final assembly of the modular unit be achieved, but in spite of what may be perceived as the effort and expense for the additional separate mounting of the rotor 4" in the generator housing 5" and the additional "flexplate 6"" component, the manufacturing costs can also be reduced. This may be because the tolerance of the air gap between the permanent magnets and the poles of the stator windings 9" can be observed with significantly greater precision that in similar known devices. The result can essentially be a significant increase in the performance of the generator 3", which in turn can essentially result in a corresponding reduction of the amount of material required for otherwise equal performance, power, or efficiency from the cost-intensive and high-grade material for the permanent magnets. In spite of what may be perceived as a potentially significantly higher cost on one hand, the overall solution can essentially be more economical, especially since the number of defects and errors in assembly and installation can be significantly reduced.

One feature of the invention resides broadly in the electric motor-transmission component, in particular for the individual drive of a wheel of a motor vehicle, comprising: a support part 4, an electric motor 3 with a motor shaft which rotates around an axis of rotation 8 relative to the support part 5, a rotor 13 held ion the motor shaft 9 and a stator 11 which is stationary relative to the support part 5, and a planetary transmission 7 with a driven shaft part 41 which rotates around the axis of rotation 8 relative to the support part 5 and three transmission components which rotate relative to one another around the axis of rotation 8, a first transmission component of which forms a sun wheel 31 which is centered on the axis of rotation 8, a second transmission component of which forms a ring gear 33 which coaxially surrounds the sun wheel 31, and a third transmission component of which forms a planet carrier 3, 41, and several planet wheels 37, which are rotationally mounted axially parallel to the axis of rotation 8, are offset from one another in the circumferential direction, and are engaged with the sun wheel 31 and the ring gear 33, whereby the first transmission component is non-rotationally and equiaxially connected to the motor shaft 9, another of the three transmission components is fastened to the driven shaft part 41, and yet another of the three transmission components is non-rotationally connected to the support part 5, characterized by the fact that the motor shaft 9 and the driven shaft part 41 are supported on axially opposite sides of the plane of rotation of the planet wheels 37 by means of roller bearings 19, 43 on the support part 5, and that the driven shaft part 41 and the transmission components permanently connected to it are supported jointly on the support part 5 by means of a single, single-row roller bearing 43 which has some radial play.

Another feature of the invention resides broadly in the component characterized by the fact that the single-row roller bearing is designed as a single-row ball bearing 43.

Yet another feature of the invention resides broadly in the component characterized by the fact that the ball bearing 43 comprises an inner ring 47, an outer ring 49 concentric to it, and a series of balls 51 guided in raceways 53, 55 of the inner ring 47 and of the outer ring 49, whereby at least one of the raceways 53, 55—viewed in the axial longitudinal section of the ball bearing 43—has a groove radius which is larger by 1 to 4%, preferably by 2 to 3%, than the radius of the balls.

Still another feature of the invention resides broadly in the component characterized by the fact that the electric motor is designed as an external rotor motor 3 with a ring-shaped stator 11 which encloses a cavity, and a ring-shaped external rotor 13, in particular a permanent magnet external rotor, which surrounds the stator radially outwardly, and is held on one end of the motor shaft 9, that the support part 5 has a bearing extension 21 which extends axially into the cavity of the stator 11 and encloses the motor shaft 9, and that the motor shaft 9 is supported axially by means of a roller bearing system comprising at least one roller bearing 19 between the one end of the motor shaft 9 which holds the rotor 11, and the sun wheel 31 located on the motor shaft 9, in the bearing extension 21.

A further feature of the invention resides broadly in the component characterized by the fact that the motor shaft 9 is a tubular part, in particular a laminated tubular part, in at least a portion of its length between the sun wheel 31 and the roller bearing system which supports the motor shaft 9 on the bearing extension 21.

Another feature of the invention resides broadly in the component characterized by the fact that the driven shaft part 41 is designed as an axially sealed and closed component, and is sealed on the side of the single-row roller bearing 43 axially farther from the planet wheels 37 by means of a first kinetic seal 45 with respect to the support part 5, and that the motor shaft 9 is sealed by means of a second kinetic seal 23 with respect to the bearing extension 21.

Yet another feature of the invention resides broadly in the component characterized by the fact that the driven shaft portion 41 is designed as a planet carrier.

In recapitulation, VDI-Berichte [VDI-Reports] No. 878, 1991, Pages 611 to 622, discloses that the drive wheels of a motor vehicle can have corresponding separate electric motors which are rotationally connected to the corresponding drive wheels by means of universal joint propeller shafts. The electric motors are combined into one component and are powered by means of electronic commutation circuits from a generator which, for its part, is driven by an internal combustion engine. The drive torque and the speed of the electric motors is controlled electrically, so that mechanical transmissions etc., like those which are located between the internal combustion engine and the drive wheels in conventional motor vehicles, are unnecessary. The electric motors are permanent magnet external rotor motors which drive the corresponding drive wheel directly.

EP-A-249 807 discloses an electrical propulsion system for a motor vehicle with permanent magnet external rotor motors which area combined in pairs into a single component, in which for each external rotor motor, there is a spur gear transmission, whereby the driven shaft part of each transmission is connected by means of a universal joint propeller shaft to the corresponding drive wheel which is in turn guided and suspended on the vehicle body. To be able to use the longest possible universal joint propeller shaft and thus those to which the load is applied at only comparatively small bending angles, the spur gear transmissions are located between the external rotor motors, so that the driven shaft parts of the spur gear transmissions can be installed radially alongside the external rotor motors and near the longitudinal center plane of the motor vehicle. Both the motor shaft of the external rotor motor and the driven shaft parts of the spur gear transmissions are mounted by means of double-row roller bearings on bearing sleeves of the transmission housing.

DE-A-37 25 620 also discloses, on a motor vehicle with electric motors corresponding to the individual drive wheels, that the electric motors can be combined into one component and can be located axially between the drive wheels, and facing the drive wheel to be driven, a planetary transmission can be attached to the electric motor, the sun wheel of which sits on the driven shaft of the electric motor, and the planet carrier of which supports the planet wheels and is connected to the drive wheel by means of a universal joint propeller shaft. A ring gear which, like the sun wheel, is engaged with the planet wheels, can be fixed by means of a multiple disc brake relative to the electric motor, and when the brake is released, makes it possible to uncouple the electric motor from the drive wheel. The electric motors, axially on both sides of their rotor bodies, have rotors which are mounted in a motor housing. While the planet carrier which forms the driven shaft part is supported by means of a bearing neck in the motor shaft which in this area is designed as a hollow shaft and supports the sun wheel, the ring gear which can be fixed by means of the multiple disc brake is for its part rotationally mounted on a bearing extension of the motor housing.

In further recapitulation, in accordance with a preferred embodiment of the present invention, the object is to create an electric motor-transmission component which has relatively small dimensions, and can still be designed for a high output power.

The invention departs from an electric motor-transmission component of the type described above, which comprises:

a support part, an electric motor with a motor shaft which rotates around an axis of rotation relative to the support part, a rotor held on the motor shaft and a stator which is stationary relative to the support part, and a planetary transmission with a driven shaft part which rotates around the axis of rotation relative to the support part and three transmission components which rotate relative to one another around the axis of rotation, a first transmission component of which forms a sun wheel which is centered on the axis of rotation, a second transmission component of which forms a ring gear which coaxially surrounds the sun wheel, and a third transmission component of which forms a planet carrier, and several planet wheels which are rotationally mounted axially parallel to the axis of rotation, are offset from one another in the circumferential direction, and are engaged with the sun wheel and the ring gear, whereby the first transmission component is non-rotationally and equiaxially connected to the motor shaft, another of the three transmission components is fastened to the driven shaft part, and yet another of the three transmission components is non-rotationally connected to the support part.

In final recapitulation, the invention relates to an electric motor-transmission component for the individual drive of a wheel of a motor vehicle, in which a rotor (13) of an electric motor (3) is mounted with its motor shaft (9) by means of a roller bearing (19) on a support part (5) which simultaneously forms a housing for a planetary transmission (7). The motor shaft (9) supports, equiaxially with respect to its axis of rotation (8), a sun wheel (31) which is surrounded by a ring gear (33) held on the support part (5). Engaged with the sun wheel (31) and the ring gear (33) are planet wheels (37) which are supported axially parallel to the axis of rotation (8) of the motor shaft (9) on a driven shaft part (41) of the planetary transmission (7). The driven shaft part (41) is supported by means of a single, single-row roller bearing (43) on the support part (5). This roller bearing (43) is located on the side of the plane of rotation of the planet wheels (37) axially farther from the roller bearing (19) of the motor shaft (9), and has some radial play. The toothed portions of the planet wheels (37) can thus move relative to the toothed portions of the ring gear (33) or of the sun wheel (31), and also support the driven shaft part (41).

The components disclosed in the various publications, disclosed or incorporated by reference herein, may be used in the embodiments of the present invention, as well as, equivalents thereof.

Examples of flexplate components, which may be utilized in accordance with the embodiments of the present invention, may be found in the following U.S. Patents: U.S. Pat. No. 5,323,665, which issued to Rediker on Jun. 28, 1994; U.S. Pat. No. 5,184,524, which issued to Senia on Feb. 9, 1993; U.S. Pat. No. 5,121,821, which issued to Poorman et al. on Jun. 16, 1992; and U.S. Pat. No. 4,672,867, which issued to Rodriguez on Jun. 16, 1987.

Examples of hybrid drive arrangements, such as internal combustion engine-electric generator arrangements, and components associated therewith, such as control arrangements and individual motors for driving corresponding wheels, may be found in the following U.S. Patents: U.S. Pat. No. 5,327,987, which issued to Abdelmalek on Jul. 12, 1994; U.S. Pat. No. 5,318,142, which issued to Bates et al. on Jun. 7, 1994; U.S. Pat. No. 5,301,764, which issued to Gardner on Apr. 12, 1994; U.S. Pat. No. 5,249,637, which issued to Heidl et al. on Oct. 5, 1993; U.S. Pat. No. 5,176,213, which issued to Kawai et al. on Jan. 5, 1993; U.S. Pat. No. 5,327,992, which issued to Boll on Jul. 12, 1994; U.S. Pat. No. 5,291,960, which issued to Brandenburg et al. on Mar. 8, 1994; and U.S. Pat. No. 5,264,764, which issued to Kuang on Nov. 23, 1993.

Examples of electric and hybrid vehicles, and related components, may be or are disclosed in the following U.S. Patents: U.S. Pat. No. 5,251,721 entitled "Semi-hybrid Electric Automobile" to Ortenheim; U.S. Pat. No. 5,004,061 entitled "Electrically Powered Motor Vehicle" to Andruet; U.S. Pat. No. 5,289,100 entitled "System for Powering, Speed Control, Steering, and Braking" to Joseph; U.S. Pat. No. 5,265,486 entitled "Portable External Drive Assembly" to AAMCO Corporation; U.S. Pat. No. 5,289,890 entitled "Drive Unit for Electric Motor Vehicle" to Aisin; and U.S. Pat. No. 5,310,387 entitled "Differential Motor Drive" to Hughes Aircraft Company.

Additional examples of electric vehicles in which the present invention may be utilized may be or are disclosed in the following U.S. Patents: U.S. Pat. No. 5,166,584 entitled "Electric Vehicle" to Nissan; U.S. Pat. No. 5,161,634 entitled "Electric Vehicle" to Kubota Corporation; and U.S. Pat. No. 5,150,045 entitled "Electric Automobile" to Kaisha.

Examples of planetary gear transmissions which may be utilized in accordance with the embodiments of the present invention, may be found in the following U.S. Patents: U.S. Pat. No. 5,120,282 entitled "Vehicle Transmission System" which issued on Jun. 9, 1992; U.S. Pat. No. 5,035,158 entitled "Electric Shift and Transfer Case Apparatus with Control System Therefor" issued on Jul. 30, 1991; U.S. Pat. No. 5,007,887 entitled "Planetary Gear Transmission for Motor Vehicle" issued on Apr. 16, 1991; U.S. Pat. No. 4,988,329 entitled "Final Drive Assembly" issued on Jan. 29, 1991; U.S. Pat. No. 4,963,124 entitled "Planetary Gear Transmission for Motor Vehicle" issued on Sep. 16, 1990; U.S. Pat. No. 5,019,755 entitled "Electric Motor Drive System" issued on May 28, 1991; and U.S. Pat. No. 5,014,800 entitled "Motor Driving Device Provided with Decelerator and Electric Vehicle" issued on May 14, 1991.

Examples of hydrostatic transmissions which may be utilized in accordance with the embodiments of the present invention, may be found in the following U.S. Patents: U.S. Pat. No. 5,071,391 entitled "Stepless Speed Changing Hydrostatic Transmission" to Shimadzu Corporation; U.S. Pat. No. 5,056,615 entitled "Vehicle Control System" to Johnston Engineering Limited; U.S. Pat. No. 5,046,994 entitled "Vehicle Transmission Assembly" to Kokyukoki; U.S. Pat. No. 5,048,295 entitled "Hydrostatic Transmission" to Hydromatik; U.S. Pat. No. 5,052,987 entitled "Stepless Hydrostatic-mechanical Transmission" to Nutzfahrzeuge; U.S. Pat. No. 4,951,462 entitled "Hydrostatic Transmission with Motor Start Control System" to Eaton; and U.S. Pat. No. 4,903,792 entitled "Hydraulic Motors and Vehicle Hydrostatic Transmission System of Wheel Motor Type" to Tan.

Examples of coolant pumps, which may be utilized in accordance with the embodiments of the present invention, may be found in the following U.S. Patents: U.S. Pat. No. 4,643,135, which issued to Wunsche on Feb. 17, 1987; U.S. Pat. No. 4,677,943, which issued to Skinner on Jul. 7, 1987; U.S. Pat. No. 4,827,589, which issued to Friedriches on May 9, 1989; U.S. Pat. No. 4,886,989, which issued to Britt on Dec. 12, 1989; and U.S. Pat. No. 4,728,840, which issued to Newhouse on Mar. 1, 1988.

Examples of electronic commutation devices, which may be utilized in accordance with the embodiments of the present invention, may be found in the following U.S. Patents: U.S. Pat. No. 5,164,623 entitled "Independent-drive Wheel for a Wheel-mounted Vehicle"; U.S. Pat. No. 5,117,167 entitled "Commutating Energy Suppression Circuit for an Electronically Commutated DC Motor" to Rotron; U.S. Pat. No. 5,258,679 entitled "Structure of DC Motor with Electronic Commutation" to ECIA; and U.S. Pat. No. 5,117,167 entitled "Commutating Energy Suppression Circuit for an Electronically Commutated DC Motor" to Totron.

Examples of kinetic seals, which may be utilized in accordance with the embodiments of the present invention, may be found in the following U.S. Patents: U.S. Pat. No. 4,989,883 entitled "Static and Dynamic Shaft Seal Assembly" to Inpro; U.S. Pat. No. 5,088,385 entitled "Actuator Apparatus with Secondary Seal Motion" to Westinghouse; U.S. Pat. No. 5,192,085 entitled "Rubber Drive System Mechanical Seal"; U.S. Pat. No. 5,226,837 entitled "Environmentally Protected Connection" to Raychem; and U.S. Pat. No. 5,286,063 entitled "Ball and Socket Floating Seal Assembly" to Babcock & Wilcox.

Examples of Phase angle sensors, which may be utilized in accordance with the embodiments of the present invention, may be found in the following U.S. Patents: U.S. Pat. No. 5,203,290 entitled "Intake and/or Exhaust-valve Timing Control System for Internal Combustion Engine" to Atsugi Unisia; U.S. Pat. No. 5,277,063 entitled "Single Plane Trim Balancing" to General Electric; U.S. Pat. No. 5,353,636 entitled "Device for Determining Misfiring of Cylinders in Multi-cylinder Engines" to Toyota; U.S. Pat. No. 5,068,876 entitled "Phase Shift Angle Detector" to Sharp; U.S. Pat. No. 5,097,220 entitled "Circuit for Demodulating PSK Modulated Signal by Differential-Defection to Japan Radio; and U.S. Pat. No. 5,063,332 entitled "Feedback Control System for a High-efficiency Class-D Power Amplifier Circuit".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 21 427.8, filed on Jun. 18, 1994, having inventor Dieter Lutz, and DE-OS P to 21 427.8 and DE-PS P 44 21 427.8, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed:

1. A motor vehicle planetary transmission for a drive train of a road motor vehicle having tires, the drive train having motor means for generating mechanical power, a housing disposed about at least a portion of the motor means, at least one wheel for receiving mechanical power from the motor means to drive the motor vehicle, a propeller shaft connected to the at least one wheel for transferring mechanical power to the at least one wheel, the planetary transmission for connecting the motor means to the propeller shaft of the drive train for rotating the propeller shaft, said planetary transmission comprising:

a sun gear;

a ring gear;

a planet gear carrier;

said sun gear being disposed centrally with respect to said ring gear;

said ring gear being disposed substantially concentrically about said sun gear;

a plurality of planet gears;

said planet gear carrier rotatably mounting said plurality of planet gears between said sun gear and said ring gear;

said plurality of planet gears being disposed between and in contact with said sun gear and said ring gear;

said plurality of planet gears being disposed between and intermeshed with said sun gear and said ring gear;

said planet gears having a plane of rotation;

said planetary transmission further comprising:

input means for fixedly connected to the motor means;

output means for connecting to the propeller shaft;

a support structure;

said support structure for being connected to the housing;

means for rotatably supporting said input means with respect to said support structure;

said means for rotatably supporting being disposed axially with respect to said plane of rotation of said planet gears;

said planetary transmission further comprising:

a bearing;

said bearing comprising an inner ring;

said bearing further comprising a plurality of rotating elements;

said outer ring being disposed to coaxially surround said inner ring;

said plurality of rotating elements comprising a sole single row of rotating elements;

said single row of rotating elements being disposed between said inner ring and said outer ring;

said single row of rotating elements being disposed to be rotated by at least one of said inner ring and said outer ring;

said inner ring being disposed substantially on said output means;

said bearing being disposed to support said output means with respect to said support structure;

said output means having an axis of rotation;

said bearing being disposed to allow said output means to rotate freely in a direction about the axis of rotation of said output means;

said bearing having a radial direction extending radially with respect to the axis of rotation;

one of said inner ring, said outer ring, and said rotating elements comprising means for providing play between said inner ring and said outer ring, to permit said inner ring to move with respect to said outer ring in a radial direction;

said plurality of rotating elements comprising a sole single row of rotating elements comprising a single row of ball bearings;

said inner ring comprising an inner race;

said inner race comprising a radius of curvature;

said outer ring comprising an outer race;

said outer race comprising a radius of curvature;

each of said ball bearings having a radius of curvature;

the radius of curvature of at least one of said inner race and said outer race being larger than the radius of curvature of each of said ball bearings;

the radius of curvature of at least one of aid inner race and said outer race being larger than the radius of curvature of each of said ball bearings by one percent to four percent;

the radius of curvature of one of at least one of said inner race and said outer race being large than the radius of curvature of each of said ball bearings by two percent to three percent;

the motor vehicle planetary transmission comprising the motor means;

said motor means comprising an external rotor electric motor, said external rotor electric motor comprising:

an electric motor shaft;

a ring-shaped external rotor being disposed on said motor shaft;

a ring-shaped stator, said ring-shaped stator surrounding a central cavity;

said ring-shaped external rotor being disposed to surround said ring-shaped stator radially outward; and said ring-shaped external rotor comprising a permanent magnet rotor;

said support structure comprising a bearing extension, said bearing extension being disposed to extend into the central cavity of said ring-shaped stator, said bearing extension being disposed to surround said motor shaft;

said means for rotatably supporting said input means being disposed between said bearing extension and said motor shaft;

said electric motor shaft having two ends;

said rotor being disposed on one end of said electric motor shaft;

said sun gear being disposed on the other end of said electric motor shaft;

said means for rotatably supporting said input means comprising a roller bearing system;

said electric motor shaft being said input means;

said roller bearing system being disposed on said electric motor shaft between the two ends of said electric motor shaft; and said roller bearing system being disposed between said bearing extension and said electric motor shaft for supporting said motor shaft on said bearing extension.

2. The motor vehicle planetary transmission according to claim 1, wherein:

at least a portion of said electric motor shaft between said sun gear and said roller bearing system comprises a tubular part; and said tubular part comprises a laminated tubular part.

3. The motor vehicle planetary transmission according to claim 2, wherein:

said output means comprises two ends;

one of said output means ends comprises means for being operatively connected to the propeller shaft;

said output means comprises a seal for sealing around a rotatable body;

said output means seal is disposed between said output means and said support part, said output means seal seals between said output means and said support part;

said output means seal is disposed between said single row bearing and said end of said output means comprising said means for being operatively connected to the propeller shaft;

said motor shaft comprises a seal for sealing around a rotating body;

said motor shaft seal is disposed between said motor shaft and said support structure, said motor shaft seal seals between said motor shaft and said support structure; and said motor shaft seal is disposed between said rotor and said roller bearing system.

4. The motor vehicle planetary transmission according to claim 3, wherein said planet gear carrier is fixedly connected to said output means and said ring gear is fixedly connected to said support structure.

5. A motor vehicle planetary transmission for a drive train of a motor vehicle, the drive train having motor means for generating mechanical power, a housing disposed about at least a portion of the motor means, at least one wheel for receiving mechanical power from the motor means to drive the motor vehicle, a propeller shaft connected to the at least one wheel for transferring mechanical power to the at least one wheel, the planetary transmission for connecting the motor means to the propeller shaft of the drive train for rotating the propeller shaft, said planetary transmission comprising:

a sun gear;

a ring gear;

a planet gear carrier;

said sun gear being disposed centrally with respect to said ring gear;

said ring gear being disposed substantially concentrically about said sun gear;

a plurality of planet gears;

said planet gear carrier rotatably mounting said plurality of planet gears between said sun gear and said ring gear;

said plurality of planet gears being disposed between and in contact with said sun gear and said ring gear;

said plurality of planet gears being disposed between and intermeshed with said sun gear and said ring gear;

said planet gears having a plane of rotation;

said planetary transmission further comprising:

input means for fixedly connecting to the motor means;

output means for connecting to the propeller shaft;

a support structure;

said support structure for being connected to the housing;

means for rotatably supporting said input means with respect to said support structure;

said means for rotatably supporting being disposed axially with respect to said plane of rotation of said planet gears;

said planetary transmission further comprising:

a bearing;

said bearing comprising an inner ring;

said bearing comprising an outer ring;

said bearing further comprising a plurality of rotating elements;

said outer ring being disposed to coaxially surround said inner ring;

said plurality of rotating elements comprising a sole single row of rotating elements;

said single row of rotating elements being disposed between said inner ring and said outer ring;

said single row of rotating elements being disposed to be rotated by at least one of said inner ring and aid outer ring;

said inner ring being disposed substantially on said output means;

said bearing being disposed to support said output means with respect to said support structure;

said output means having an axis of rotation;

said bearing being disposed to allow said output means to rotate freely in a direction about the axis of rotation of said output means;

said input means having an axis of rotation;

means for permitting said output means to move in an angular direction with respect to said input means thus permitting the angle of intersection between the output means axis of rotation and the input means axis of rotation to vary;

said angular moving means comprising means for providing substantial play between said inner ring and said outer ring;

at lest one of said inner ring, said outer ring, and said rotating elements comprising said play providing means;

said plurality of rotating elements comprising a sole single row of rotating elements comprising a single row of ball bearings;

said inner ring comprising an inner race;

said inner race comprising a radius of curvature;

said outer ring comprising an outer race;

said outer race comprising a radius of curvature;

each of said ball bearings having a radius of curvature;

the radius of curvature of at least one of said inner race and said outer race being larger than the radius of curvature of each of said ball bearings;

the radius of curvature of at least one of said inner race and said outer race being larger than the radius of curvature of each of said ball bearings by at least one percent;

the motor vehicle planetary transmission comprising the motor means;

said motor means comprising an external rotor electric motor, said external rotor electric motor comprising:

an electric motor shaft;

a ring-shaped external rotor being disposed on said motor shaft;

a ring-shaped stator, said ring-shaped stator surrounding a central cavity;

said ring-shaped external rotor being disposed to surround said ring-shaped stator radially outward; and said ring-shaped external rotor comprising a permanent magnet rotor;

said support structure comprising a bearing extension, said bearing extension being disposed to extend into the central cavity of said ring-shaped stator, said bearing extension being disposed to surround said motor shaft;

said means for rotatably supporting said input means being disposed between said bearing extension and said motor shaft;

said electric motor shaft having two ends;

said rotor being disposed on one end of said electric motor shaft;

said sun gear being disposed on the other end of said electric motor shaft;

said means for rotatably supporting said input means comprising a roller bearing system;

said electric motor shaft being said input means;

said roller bearing system being disposed on said electric motor shaft between the two ends of said electric motor shaft;

said roller bearing system being disposed between said bearing extension and said electric motor shaft for supporting said motor shaft on said bearing extension;

at least a portion of said electric motor shaft between said sun gear and said roller bearing system comprising a tubular part;

said tubular part comprising a laminated tubular part;

said output means comprising two ends;

one of said output means ends comprising means for being operatively connected to the propeller shaft;

said output means comprising a seal for sealing around a rotatable body;

said output means seal being disposed between said output means and said support part, said output means seal sealing between said output means and said support part;

said output means seal being disposed between said single row bearing and said end of said output means comprising said means for being operatively connected to the propeller shaft;

said motor shaft comprising a seal for sealing around a rotating body;

said motor shaft seal being disposed between said motor shaft and said support structure, said motor shaft seal sealing between said motor shaft and said support structure;

said motor shaft seal being disposed between said rotor and said roller bearing system;

said planet gear carrier being fixedly connected to said output means; and said ring gear being fixedly connected to said support structure.

6. A combination electric motor and planetary transmission for a drive train of a motor vehicle, the drive train having at least one wheel for receiving mechanical power from the electric motor to drive the motor vehicle, a propeller shaft connected to the at least one wheel for transferring mechanical power to the at least one wheel, said combination electric motor and planetary transmission comprising:

a housing;

an electric motor;

said electric motor comprising a rotor;

a first transmission component comprising a sun gear;

a second transmission component comprising a ring gear;

a third transmission component comprising a planet gear carrier;

said sun gear being disposed centrally with respect to said ring gear;

said ring gear being disposed substantially concentrically about said sun gear;

a plurality of planet gears;

said planet gear carrier rotatably mounting said plurality of planet gears between said sun gear and said ring gear;

said plurality gear carrier rotatably mounting said plurality of planet gears between said sun gear and said ring gear;

said plurality of planet gears being disposed between and in contact with said sun gear and said ring gear;

said plurality of planet gears being disposed between and intermeshed with said sun gear and said ring gear;

said planet gears having a plane of rotation;

input means comprising a motor shaft being fixedly connected to said rotor;

output means for connecting to the propeller shaft;

a support structure;

said support structure being connected to said housing;

means for rotatably supporting said motor shaft with respect to said support structure;

said means for rotatably supporting being disposed axially with respect to said plane of rotation of said planet gears;

said combination electric motor and planetary transmission further comprising:

a bearing;

said bearing comprising an inner ring;

said bearing comprising an outer ring;

said bearing further comprising a plurality of rotating elements;

said outer ring being disposed to coaxially surround said inner ring;

said plurality of rotating elements comprising a sole single row of rotating elements;

said single row of rotating elements being disposed between said inner ring and said outer ring;

said single row of rotating elements being disposed to be rotated by at least one of said inner ring and said outer ring;

one of said three transmission components being fixedly connected to said output part;

another of said three transmission components being fixedly connected to said support part;

said inner ring being disposed substantially on said output means;

said bearing being disposed to support said output means with respect to said support structure;

said output means having an axis of rotation;

said bearing being disposed to allow said output means to rotate freely in a direction about the axis of rotation of said output means;

said bearing having a radial direction extending radially with respect to the axis of rotation;

one of said inner ring, said outer ring, and said rotating elements comprising means for providing play between said inner ring and said outer ring, to permit said inner ring to move with respect to said outer ring in a radial direction;

said means for providing play between said inner ring and said outer ring being dimensioned for permitting said another transmission component fixedly connected to said support part to radially support said one transmission component fixedly connected to said output part;

said plurality of rotating elements comprising a sole single row of rotating elements comprising a single row of ball bearings;

said inner ring comprising an inner race;

said inner race comprising a radius of curvature;

said outer ring comprising an outer race;

said outer race comprising a radius of curvature;

each of said ball bearings having a radius of curvature;

the radius of curvature of at least one of said inner race and said outer race being larger than the radius of curvature of each of said ball bearings;

the radius of curvature of at least one of said inner race and aid outer race being larger than the radius of curvature of each of said ball bearings by at least one percent;

the radius of curvature of at least one of said inner race and said outer race being larger than the radius of curvature of each of said ball bearings by two percent to three percent;

said electric motor comprising an external rotor electric motor, said external rotor electric motor comprising:

an electric motor shaft;

a ring-shaped external rotor being disposed on said motor shaft;

a ring-shaped stator, said ring-shaped stator surrounding a central cavity;

said ring-shaped external rotor being disposed to surround said ring-shaped stator radially outward; and said ring-shaped external rotor comprising a permanent magnet rotor;

said support structure comprising a bearing extension, said bearing extension being disposed to extend into the central cavity of said ring-shaped stator, said bearing extension being disposed to surround said motor shaft;

said means for rotatably supporting said input means being disposed between said bearing extension and said motor shaft;

said electric motor shaft having two ends;

said rotor being disposed on one end of said electric motor shaft;

said sun gear being disposed on the other end of said electric motor shaft;

said means for rotatably supporting said input means comprising a roller bearing system;

said electric motor shaft being said input means;

said roller bearing system being disposed on said electric motor shaft between the two ends of said electric motor shaft; and said roller bearing system being disposed between said bearing extension and said electric motor shaft for supporting said motor shaft on said bearing extension.

7. The combination electric motor and planetary transmission according to claim 6, wherein:

at least a portion of said electric motor shaft between said sun gear and said roller bearing system comprising a tubular part; and said tubular part comprises a laminated tubular part.

8. The combination electric motor and planetary transmission according to claim 7, wherein:

said output means comprises two ends;

one of said output means ends comprises means for being operatively connected to the propeller shaft;

said output means comprises a seal for sealing around a rotatable body;

said output means seal is disposed between said output means and said support part, said output means seal seals between said output means and said support part;

said output means seal is disposed between said single row bearing and said end of said output means comprising said means for being operatively connected to the propeller shaft;

said motor shaft comprises a seal for sealing around a rotating body;

said motor shaft seal is disposed between said motor shaft and said support structure, said motor shaft seal seals between said motor shaft and said support structure;

said motor shaft seal is disposed between said rotor and said roller being system;

said planet gear carrier is fixedly connected to said output means; and said ring gear is fixedly connected to said support structure.

* * * * *

UNITED STATES PATENT AND TRADEMARK OFFICE
CERTIFICATE OF CORRECTION

PATENT NO. : 5,679,087    Page 1 of 3
DATED : October 21, 1997
INVENTOR(S) : Dieter LUTZ It is certified that error appears in the above-identified patent and that said Letters Patent is hereby corrected as shown below:

In column 6, line 59, after '(see', delete " 10' " and insert --19'--.

In column 8, line 7, after 'located', delete "n" and insert --on--.

In column 9, line 28, after 'frame' insert the following:

--define the spatial position of the two components 21' relative to one another and to the bolster 1'. In particular, the auxiliary frame--

In column 15, line 64, after the first occurrence of 'about', delete "7°" and insert --70°--.

UNITED STATES PATENT AND TRADEMARK OFFICE
CERTIFICATE OF CORRECTION

PATENT NO. : 5,679,087
DATED : October 21, 1997
INVENTOR(S) : Dieter LUTZ

It is certified that error appears in the above-identified patent and that said Letters Patent is hereby corrected as shown below:

In column 21, line 28, after 'to', delete "Totron." and insert --Rotron.--.

In column 22, line 4, after 'DE-OS P', delete "to" and insert --44--.

In column 22, line 52, Claim 1, after 'fixedly', delete "connected" and insert --connecting--.

In column 22, after line 65 ending with 'ring;' insert the following new paragraph:

--said bearing comprising an outer ring;--.

UNITED STATES PATENT AND TRADEMARK OFFICE
CERTIFICATE OF CORRECTION

PATENT NO. : 5,679,087
DATED : October 21, 1997
INVENTOR(S) : Dieter LUTZ

It is certified that error appears in the above-identified patent and that said Letters Patent is hereby corrected as shown below:

In column 23, line 39, Claim 1, after the third occurrence of 'of', delete "aid" and insert --said--.

In column 25, line 37, Claim 5, after 'and', delete "aid" and insert --said--.

In column 28, line 40, Claim 6, after 'and', delete "aid" and insert --said--.

In column 29, line 18, Claim 7, after 'system', delete "comprising" and insert --comprises--.

In column 30, line 19, Claim 8, after 'roller', delete "being" and insert --bearing--.

Signed and Sealed this

Twenty-third Day of June, 1998

*Attest:*

BRUCE LEHMAN

*Attesting Officer*    *Commissioner of Patents and Trademarks*